US009185054B2

(12) United States Patent
Revanuru et al.

(10) Patent No.: US 9,185,054 B2
(45) Date of Patent: Nov. 10, 2015

(54) SYSTEM AND METHOD FOR PROVIDING ZERO BUFFER COPYING IN A MIDDLEWARE MACHINE ENVIRONMENT

(75) Inventors: Naresh Revanuru, Fremont, CA (US); Ballav Bihani, Fremont, CA (US); Staffan Larsen, Stockholm (SE); Steven Liu, Beijing (CN); Lenny Phan, Sunnyvale, CA (US); Scott Oaks, New York, NY (US); Patrik Torstensson, Stockholm (SE); Adam Messinger, San Francisco, CA (US); Nathan Reynolds, Meza, AZ (US); Oleksandr Otenko, Winnersh (GB); Joshua Dorr, Santa Clara, CA (US); Brad Cameron, Santa Rosa, CA (US); Ola Torudbakken, Oslo (NO); Pallab Bhattacharya, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/234,027

(22) Filed: Sep. 15, 2011

(65) Prior Publication Data
US 2012/0239730 A1  Sep. 20, 2012

Related U.S. Application Data

(63) Continuation-in-part of application No. 13/109,849, filed on May 17, 2011, which is a continuation-in-part of application No. 13/109,871, filed on May 17, 2011, which is a continuation-in-part of application No.

(Continued)

(51) Int. Cl.
*G06F 3/00* (2006.01)
*H04L 12/931* (2013.01)

(Continued)

(52) U.S. Cl.
CPC .............. *H04L 49/358* (2013.01); *H04L 67/02* (2013.01); *H04L 67/142* (2013.01); *G06F 9/45504* (2013.01)

(58) Field of Classification Search
None
See application file for complete search history.

(56) References Cited

U.S. PATENT DOCUMENTS 5,109,384 A  4/1992 Tseung
5,333,274 A  7/1994 Amini
(Continued)

FOREIGN PATENT DOCUMENTS

JP  2000339287  12/2000
JP  2003196229  7/2003
(Continued)

OTHER PUBLICATIONS

PCT International Search Report in re: PCT Application No: PCT/US2011/051697 dated Dec. 6, 2011, 11 Pages.
(Continued)

*Primary Examiner* — Gregory A Kessler
(74) *Attorney, Agent, or Firm* — Tucker Ellis LLP

(57) ABSTRACT

A system and method for providing a middleware machine or similar platform. In accordance with an embodiment the system (referred to herein in some implementations as "Exalogic") comprises a combination of high performance hardware, together with an application server or middleware environment, to provide a complete Java EE application server complex which includes a massively parallel in-memory grid, can be provisioned quickly, and can scale on demand. In accordance with an embodiment, the system can be deployed as a full, half, or quarter rack, or other configuration, that provides an application server grid, storage area network, and InfiniBand network, which support the execution of an application server, middleware or other functionality such as, for example, WebLogic Server, JRockit or Hotspot JVM, Oracle Linux or Solaris, and Oracle VM. Additional features of the system can include, e.g. Zero Buffer Copies, Scatter/Gather I/O, T3 Connections, and Lazy Deserialization.

17 Claims, 17 Drawing Sheets

Related U.S. Application Data

13/167,636, filed on Jun. 23, 2011, which is a continuation-in-part of application No. 13/170,490, filed on Jun. 28, 2011.

(60) Provisional application No. 61/383,285, filed on Sep. 15, 2010, provisional application No. 61/384,227, filed on Sep. 17, 2010.

(51) Int. Cl.
   *H04L 29/08* (2006.01)
   *G06F 9/455* (2006.01)

(56) References Cited

U.S. PATENT DOCUMENTS

| | | |
|---|---|---|
| 6,424,992 B2 | 7/2002 | Devarakonda et al. |
| 6,466,965 B1 | 10/2002 | Chessell |
| 6,895,590 B2 | 5/2005 | Yadav |
| 6,938,085 B1 | 8/2005 | Belkin et al. |
| 7,376,953 B2 | 5/2008 | Togasaki |
| 7,394,288 B1 | 7/2008 | Agarwal |
| 7,483,374 B2 | 1/2009 | Nilakantan et al. |
| 7,554,993 B2 | 6/2009 | Modi et al. |
| 7,831,731 B2 | 11/2010 | Tang |
| 7,991,904 B2 * | 8/2011 | Melnyk et al. ............... 709/230 |
| 8,130,776 B1 | 3/2012 | Sundarajan |
| 8,131,860 B1 * | 3/2012 | Wong et al. ............... 709/228 |
| 8,260,757 B1 | 9/2012 | Chatterjee et al. |
| 8,578,033 B2 | 11/2013 | Mallart |
| 8,601,057 B2 | 12/2013 | Han |
| 2002/0174136 A1 | 11/2002 | Cameron et al. |
| 2003/0014480 A1 | 1/2003 | Pullara et al. |
| 2003/0078958 A1 | 4/2003 | Pace |
| 2003/0120822 A1 | 6/2003 | Langrind et al. |
| 2004/0177126 A1 * | 9/2004 | Maine ........................... 709/217 |
| 2004/0205771 A1 | 10/2004 | Sudarshan et al. |
| 2005/0021354 A1 | 1/2005 | Brendle et al. |
| 2005/0027901 A1 | 2/2005 | Simon |
| 2005/0038801 A1 | 2/2005 | Colrain et al. |
| 2005/0094577 A1 | 5/2005 | Ashwood-Smith |
| 2005/0102412 A1 | 5/2005 | Hirsimaki |
| 2005/0223109 A1 | 10/2005 | Mamou |
| 2005/0262183 A1 | 11/2005 | Colrain |
| 2005/0262215 A1 | 11/2005 | Kirov et al. |
| 2006/0015600 A1 | 1/2006 | Piper |
| 2006/0031846 A1 | 2/2006 | Jacobs et al. |
| 2006/0129676 A1 | 6/2006 | Modi et al. |
| 2006/0143525 A1 | 6/2006 | Kilian |
| 2006/0176884 A1 | 8/2006 | Fair |
| 2006/0209899 A1 | 9/2006 | Cucchi et al. |
| 2006/0248200 A1 | 11/2006 | Stanev |
| 2006/0294417 A1 | 12/2006 | Awashi et al. |
| 2007/0058669 A1 | 3/2007 | Hofmann |
| 2007/0162559 A1 | 7/2007 | Biswas |
| 2007/0198684 A1 | 8/2007 | Mizushima |
| 2007/0203944 A1 | 8/2007 | Batra et al. |
| 2008/0044141 A1 | 2/2008 | Willis et al. |
| 2008/0098119 A1 | 4/2008 | Jindall |
| 2008/0098458 A2 | 4/2008 | Smith |
| 2008/0140844 A1 | 6/2008 | Halpern |
| 2008/0163124 A1 | 7/2008 | Bonev |
| 2008/0195664 A1 | 8/2008 | Maharajh |
| 2008/0286741 A1 | 11/2008 | Call |
| 2009/0019158 A1 | 1/2009 | Langen |
| 2009/0024764 A1 | 1/2009 | Atherton |
| 2009/0034537 A1 | 2/2009 | Colrain et al. |
| 2009/0037367 A1 | 2/2009 | Wein |
| 2009/0103504 A1 | 4/2009 | Inumaru |
| 2009/0150647 A1 * | 6/2009 | Mejdrich et al. ............... 712/3 |
| 2009/0172636 A1 | 7/2009 | Griffith |
| 2009/0182642 A1 | 7/2009 | Sundaresan |
| 2009/0327471 A1 | 12/2009 | Astete et al. |
| 2010/0138208 A1 | 6/2010 | Hattori |
| 2010/0138531 A1 | 6/2010 | Kashyap |
| 2010/0198920 A1 | 8/2010 | Wong et al. |
| 2010/0199259 A1 * | 8/2010 | Quinn et al. ............... 717/106 |
| 2011/0029812 A1 | 2/2011 | Lu et al. |
| 2011/0055510 A1 | 3/2011 | Fritz et al. |
| 2011/0066737 A1 | 3/2011 | Mallart |
| 2011/0071981 A1 | 3/2011 | Ghosh et al. |
| 2011/0119673 A1 | 5/2011 | Bloch et al. |
| 2011/0161457 A1 | 6/2011 | Sentinelli |
| 2011/0185021 A1 | 7/2011 | Han |
| 2011/0228668 A1 | 9/2011 | Pillai et al. |
| 2011/0246582 A1 | 10/2011 | Dozsa |
| 2012/0023557 A1 | 1/2012 | Bevan |
| 2012/0131330 A1 | 5/2012 | Tonsing |
| 2012/0144045 A1 | 6/2012 | Revanuru |
| 2012/0218891 A1 | 8/2012 | Sundararajan |
| 2013/0004002 A1 | 1/2013 | Duchscher |

FOREIGN PATENT DOCUMENTS

| | | |
|---|---|---|
| JP | 2007226398 | 9/2007 |
| JP | 2008507030 | 3/2008 |
| JP | 2010128911 | 6/2010 |
| WO | 2006046972 | 5/2006 |

OTHER PUBLICATIONS

PCT International Search Report in re: PCT Application No: PCT/US2011/051459 dated Dec. 6, 2011, 9 Pages.

International Searching Authority at the European Patent Office, International Search Report and Written Opinion for PCT International Application No. PCT/US2012/044429, Mar. 5, 2014, 18 pages.

Oracle International Corporation, Oracle Fusion Middleware—Configuring and Managing JDBC Data Sources for Oracle WebLogic Server 11g Release 1 (10.3.5), Apr. 2011, pp. 1-148. Relevant Section: Section 4.1.

Oracle International Corporation, Oracle Universal Connection Pool for JDBC—Developer's Guide 11g Release 2 (11.2), Sep. 2009, pp. 1-74. Relevant Sections: p. 4, line 35—p. 5, line 15; p. 16, line 13-line 42.

Oracle International Corporation, Automatic Workload Management with Oracle Real Application Clusters 11g Release 2, Jan. 2010, pp. 1-31. Relevant Sections: p. 8_7, line 33-p. 8_10, line 21.

Oracle International Corporation, Application Failover with Oracle Database 11g, Sep. 2010, pp. 1-5. Relevant Sections: Whole document.

Baldwin, The ByteBuffer Class in Java, Aug. 20, 2002, 14 pages. Retrieved from: developer.com.

Pfister, An Introduction to the InfiniBand Architecture, High Performance Mass Storage and Parallel I/O, 2002, 617-632.

Anonymous, What is Scatter-Gather DMA (Direct Memory Access)?, Jul. 22, 2010, 2 pages.

* cited by examiner

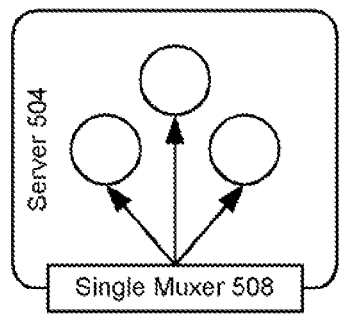
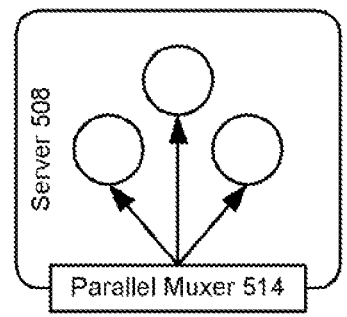
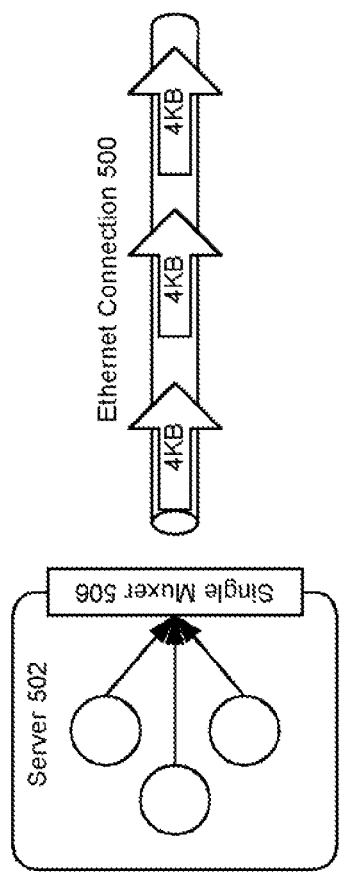
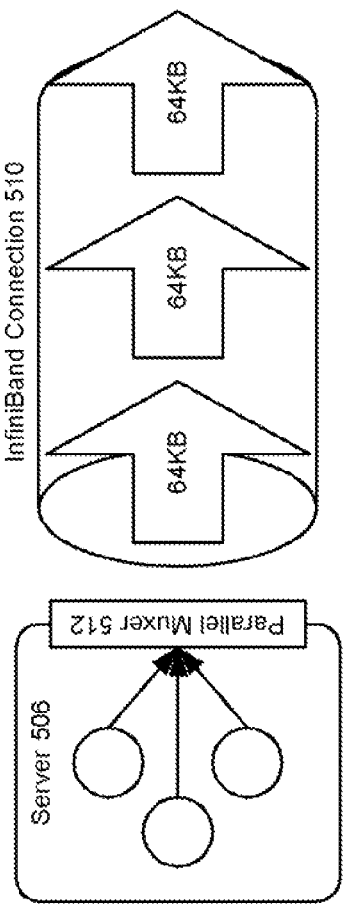
*FIGURE 9*
*FIGURE 10*

SYSTEM AND METHOD FOR PROVIDING ZERO BUFFER COPYING IN A MIDDLEWARE MACHINE ENVIRONMENT

CLAIM OF PRIORITY

This application claims the benefit of priority to U.S. Provisional Patent Application No. 61/383,285, titled "MIDDLEWARE MACHINE PLATFORM", filed Sep. 15, 2010; U.S. Provisional Patent Application No. 61/384,227, titled "MIDDLEWARE MACHINE PLATFORM", filed Sep. 17, 2010;

This application is a continuation-in part of the following U.S. patent applications:

U.S. patent application Ser. No. 13/109,849, titled "SYSTEM AND METHOD FOR ZERO BUFFER COPYING IN A MIDDLEWARE ENVIRONMENT", filed May 17, 2011;

U.S. patent application Ser. No. 13/109,871, titled "SYSTEM AND METHOD FOR PARALLEL MUXING BETWEEN SERVERS IN A CLUSTER", filed May 17, 2011;

U.S. patent application Ser. No. 13/167,636, titled "SYSTEM AND METHOD FOR SUPPORTING LAZY DESERIALIZATION OF SESSION INFORMATION IN A SERVER CLUSTER", filed Jun. 23, 2011; and U.S. patent application Ser. No. 13/170,490, titled "SYSTEM AND METHOD FOR PROVIDING SCATTER/GATHER DATA PROCESSING IN A MIDDLEWARE ENVIRONMENT", filed Jun. 28, 2011, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to systems and methods for providing a middleware machine or similar platform.

BACKGROUND

Within any large organization, over the span of many years the organization often finds itself with a sprawling IT infrastructure that encompasses a variety of different computer hardware, operating-systems, and application software. Although each individual component of such infrastructure might itself be well-engineered and well-maintained, when attempts are made to interconnect such components, or to share common resources, it is often a difficult administration task. In recent years, organizations have turned their attention to technologies such as virtualization and centralized storage, and even more recently cloud computing, which can provide the basis for a shared infrastructure. However, there are few all-in-one platforms that are particularly suited for use in such environments. These are the general areas that embodiments of the invention are intended to address.

SUMMARY

Described herein is a system and method for providing a middleware machine or similar platform. In accordance with an embodiment the system (referred to herein in some implementations as "Exalogic") comprises a combination of high performance hardware, together with an application server or middleware environment, to provide a complete Java EE application server complex which includes a massively parallel in-memory grid, can be provisioned quickly, and can scale on demand. In accordance with an embodiment, the system can be deployed as a full, half, or quarter rack, or other configuration, that provides an application server grid, storage area network, and InfiniBand network, which support the execution of an application server, middleware or other functionality such as, for example, WebLogic Server, JRockit JVM, Oracle Linux, and Oracle VM. Additional features of the system can include, e.g. Zero Buffer Copies, Scatter/Gather I/O, T3 Connections, and Lazy Deserialization.

BRIEF DESCRIPTION OF THE FIGURES

FIG. 9 shows a system that utilizes Ethernet protocol, in accordance with an embodiment.

FIG. 10 shows a system that utilizes IPoIB and parallel muxing, in accordance with an embodiment.

DETAILED DESCRIPTION

As described above, within any large organization, over the span of many years the organization often finds itself with a sprawling IT infrastructure that encompasses a variety of different computer hardware, operating-systems, and application software. Although each individual component of such infrastructure might itself be well-engineered and well-maintained, when attempts are made to interconnect such components, or to share common resources, it is often a difficult administration task. In recent years, organizations have turned their attention to technologies such as virtualization and centralized storage, and even more recently cloud computing, which can provide the basis for a shared infrastructure. However, there are few all-in-one platforms that are particularly suited for use in such environments.

To address this, described herein is a system and method for providing a middleware machine or similar platform. In accordance with an embodiment the system (referred to herein in some implementations as "Exalogic") comprises a combination of high performance hardware, e.g. 64-bit processor technology, high performance large memory, and redundant InfiniBand and Ethernet networking; together with an application server or middleware environment, such as WebLogic Suite, to provide a complete Java EE application server complex which includes a massively parallel in-memory grid, can be provisioned quickly, and can scale on demand. In accordance with an embodiment, the system can be deployed as a full, half, or quarter rack, or other configuration, that provides an application server grid, storage area network, and InfiniBand network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, InfiniBand switch gateway, and storage nodes or units, communicating with one another via an InfiniBand network.

When implemented as a rack configuration, unused portions of the rack can be left empty or occupied by fillers. Additional features of the system can include, e.g. Zero Buffer Copies, Scatter/Gather I/O, T3 Connections, and Lazy Deserialization.

Figure 1:
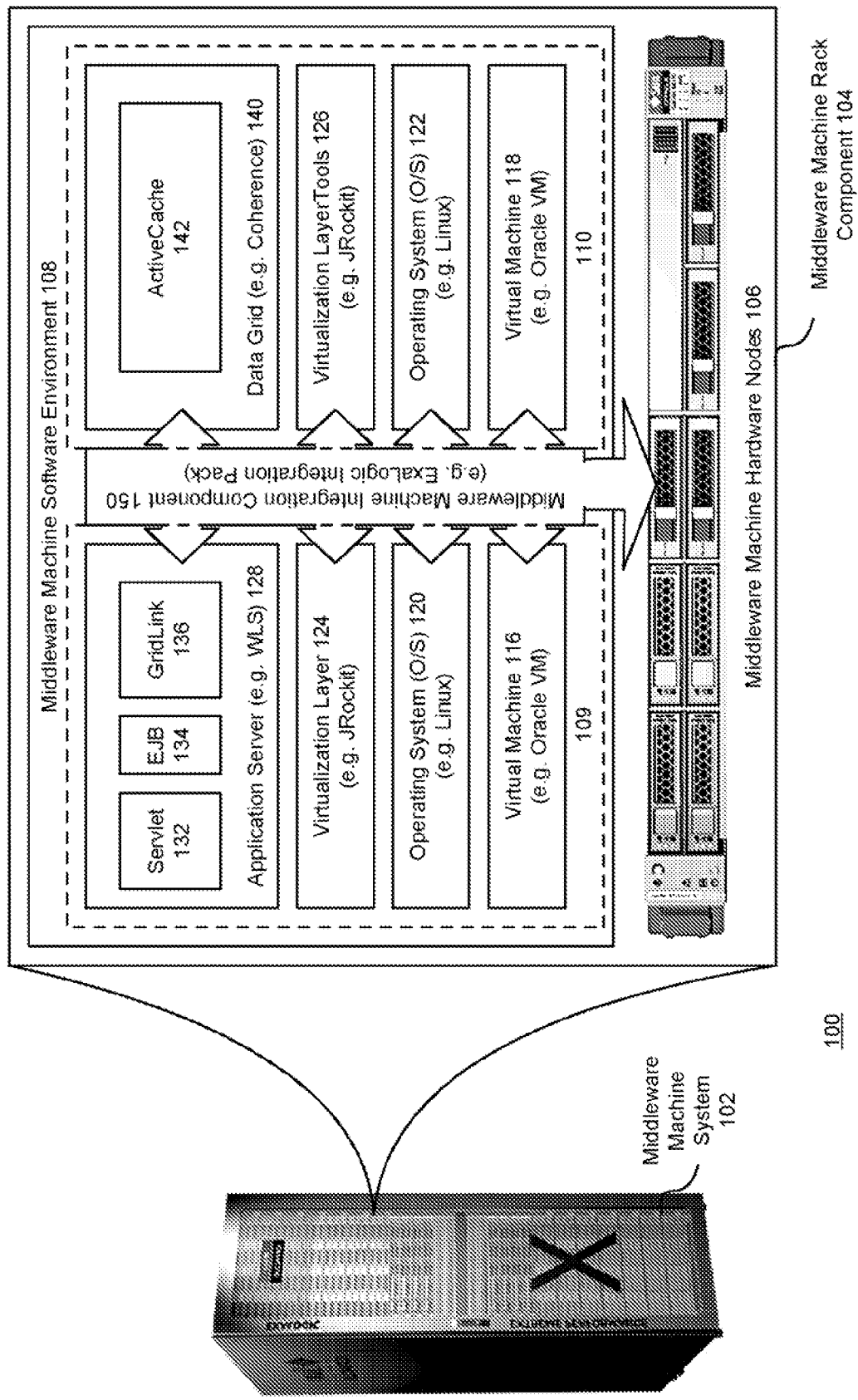
FIG. 1 shows an illustration of a middleware machine environment, in accordance with an embodiment.

FIG. 1 shows an illustration of a middleware machine environment 100, in accordance with an embodiment. As shown in FIG. 1, each middleware machine system 102 includes several middleware machine rack components 104, each of which includes a combination of high-performance middleware machine hardware nodes 106 (e.g., 64-bit processors, high performance large memory, and redundant InfiniBand and Ethernet networking), and a middleware machine software environment 108. This enables providing a complete application server environment which can be provisioned in minutes, rather than days or months, and which can scale on demand.

In accordance with an embodiment, each middleware machine system can be deployed as a full, half, or quarter rack, or other configuration of rack components, and several middleware machine systems can be coupled together, again using InfiniBand, to create larger environments. Each middleware machine software environment can be provisioned with several application server or other software instances, for example as shown in FIG. 1, a first application server instance 109 can comprise a virtual machine 116, operating system 120, virtualization layer 124, and application server layer 128 (e.g. WebLogic, including servlet 132, EJB 134, and Gridlink 136 containers); while a second or other application server instance 110 can comprise a virtual machine 118, operating system 122, virtualization layerTools 126, and data grid layer 140 (e.g. Coherence, including an active cache 142). In accordance with an embodiment, each of the application server instances can communicate with one another, and with both its middleware machine hardware node, and other nodes, using a middleware machine integration component 150, herein referred to as an Exalogic integration pack, which itself provides several optimization features, such as support for InfiniBand and other features, each of which are described in further detail below.

Figure 2:
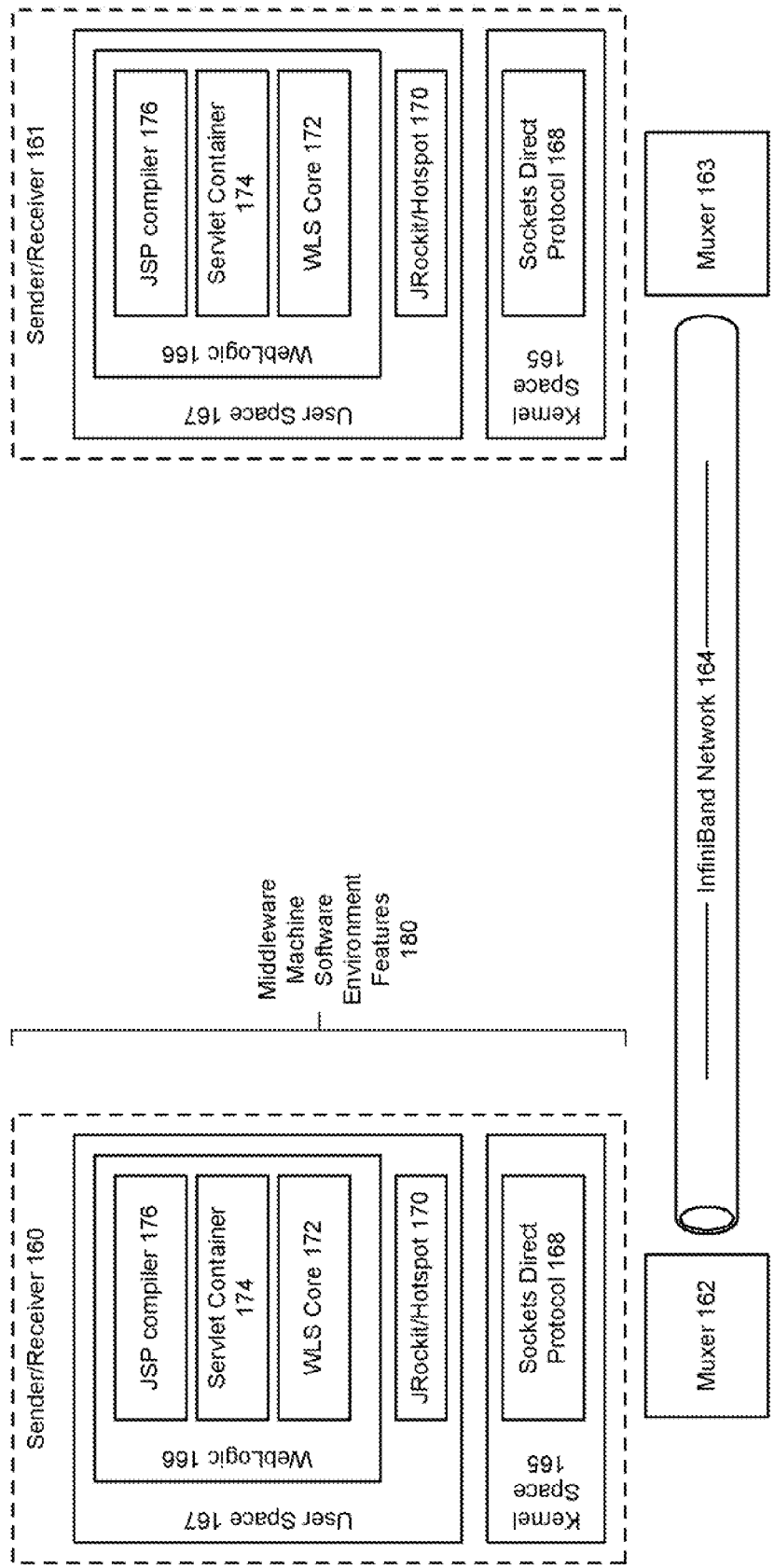
FIG. 2 shows another illustration of a middleware machine platform or environment, in accordance with an embodiment.

FIG. 2 shows another illustration of a middleware machine platform or environment, in accordance with an embodiment. As shown in FIG. 2, each application server instance can act either as a sender and/or receiver 160, 161 within the middleware machine environment. In accordance with an embodiment, each application server instance is associated with a muxer 162, 163, that allows the application server instance to communicate with other application server instances via an InfiniBand network 164. In the example shown in FIG. 2, depending on the particular implementation, an application server instance can include a kernel space 165 which in turn can include a sockets direct protocol 168, a user space 167, an application server (e.g. WebLogic) 166, a JVM (e.g. JRockit/Hotspot layer) 170, and WLS core 172, servlet container 174, and JSP compiler 176 components. In accordance with other implementations, other combinations of middleware-type software and components can be included. In accordance with various embodiments, the machine integration component can also provide one or more features such as Zero Buffer Copies, Scatter/Gather I/O, T3 Connections, and Lazy Deserialization, to provide the basis for, and improve performance within, the shared infrastructure, each of which are described in further detail below.

Figure 3:
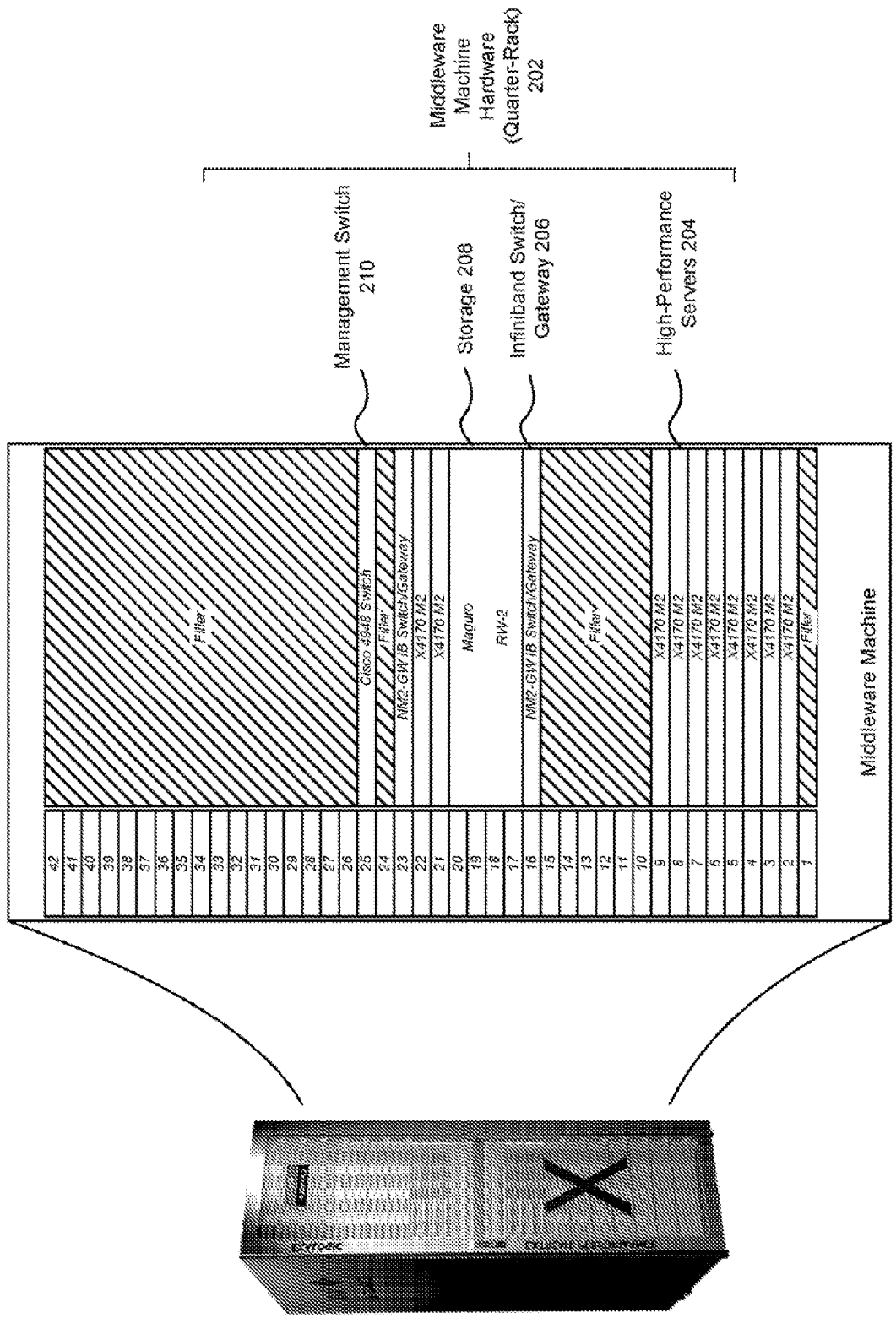
FIG. 3 shows an illustration of a middleware machine provided as a quarter-rack configuration, in accordance with an embodiment.

FIG. 3 shows an illustration of a middleware machine provided as a quarter-rack configuration, in accordance with an embodiment. As shown in FIG. 3, when provided as a quarter-rack configuration 202, the middleware machine can include a plurality of high-performance servers 204, such as X4170 M2 server nodes; one or more InfiniBand switch/gateways 206, such as NM2-GW nodes; one or more storage components 208, such as Maguro RW-2 nodes; and one or more management switches 210, such as Cisco 4948 switches. Any unused portions of the rack can be left empty or occupied by fillers.

Figure 4:
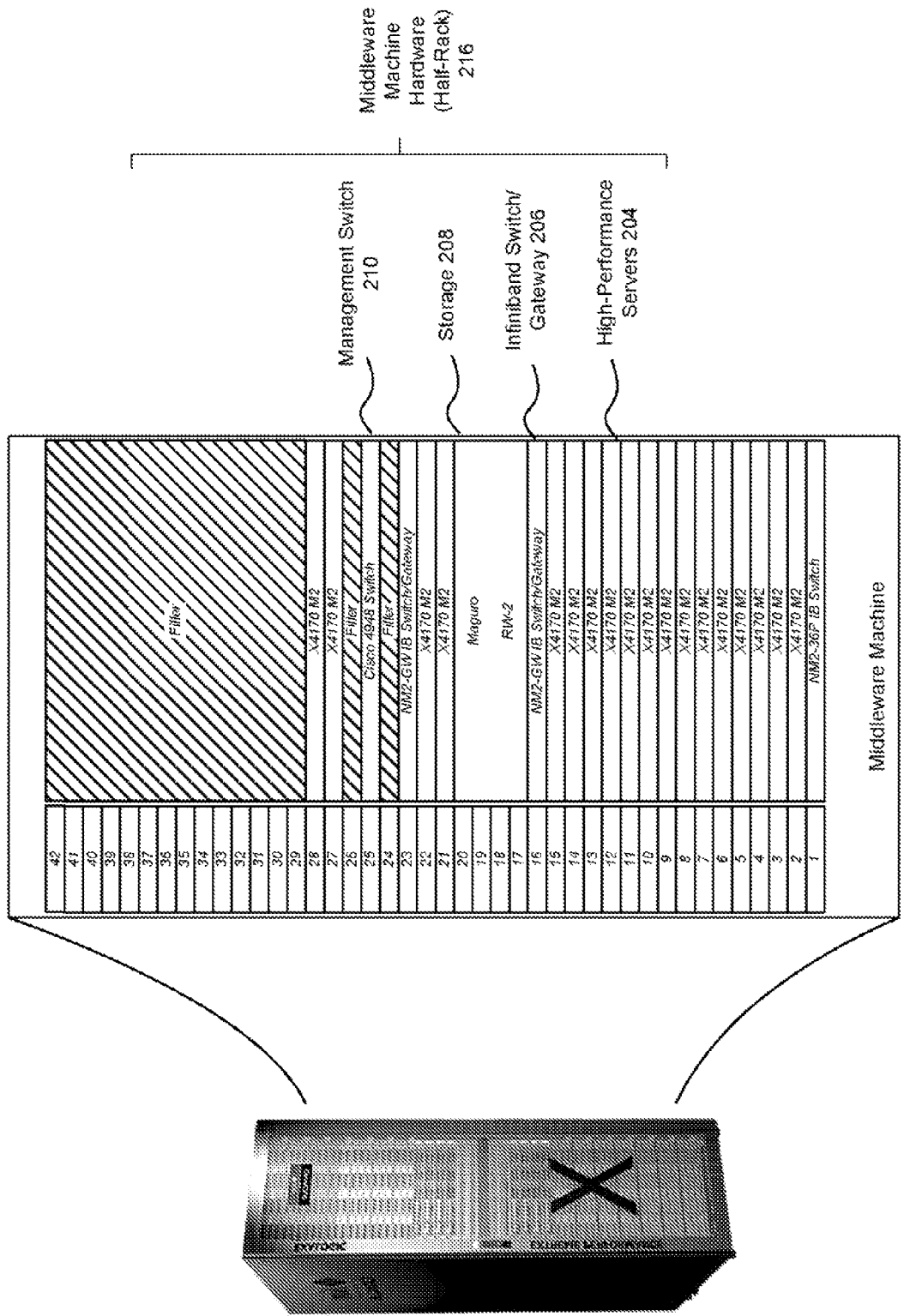
FIG. 4 shows an illustration of a middleware machine provided as a half-rack configuration, in accordance with an embodiment.

FIG. 4 shows an illustration of a middleware machine provided as a half-rack configuration, in accordance with an embodiment. As shown in FIG. 4, when provided as a half-rack configuration 216, the middleware machine can similarly include a larger number of high-performance servers, such as X4170 M2 server nodes; one or more InfiniBand switch/gateways, such as NM2-GW nodes; one or more storage components, such as Maguro RW-2 nodes; and one or more management switches, such as Cisco 4948 switches. Any unused portions of the rack can be left empty or occupied by fillers. Although they are more plentiful, the hardware components are otherwise the same as those of the quarter-rack configuration.

Figure 5:
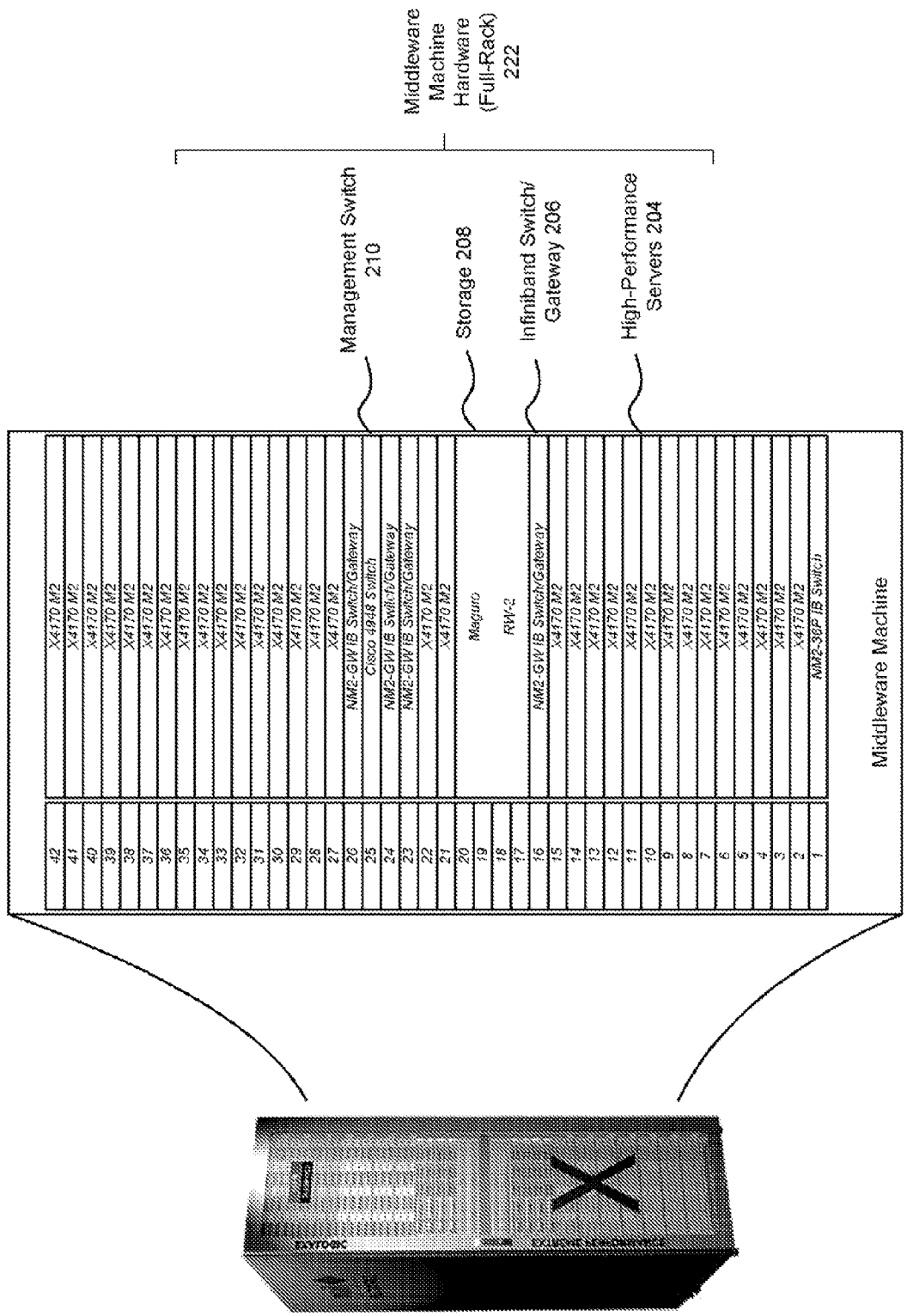
FIG. 5 shows an illustration of a middleware machine provided as a full-rack configuration, in accordance with an embodiment.

FIG. 5 shows an illustration of a middleware machine provided as a full-rack configuration, in accordance with an embodiment. As shown in FIG. 5, when provided as a full-rack configuration 222, the middleware machine can include a larger number of high-performance servers, such as X4170

M2 server nodes; one or more InfiniBand switch/gateways, such as NM2-GW nodes; one or more storage components, such as Maguro RW-2 nodes; and one or more management switches, such as Cisco 4948 switches. Again, although they are more plentiful, the hardware components are otherwise the same as those of the quarter-rack and half-rack configurations.

Figure 6:
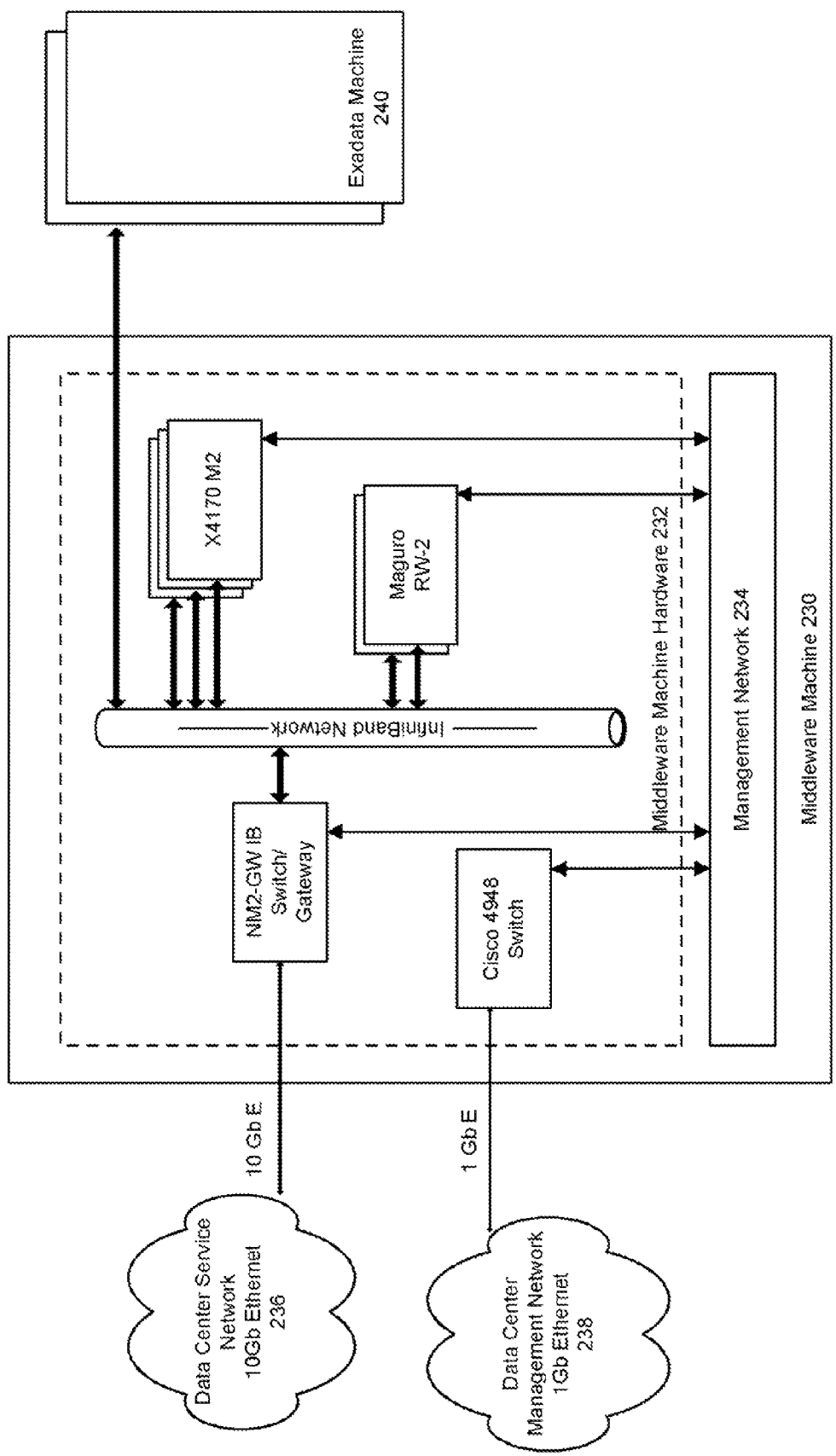
FIG. 6 shows an illustration of a middleware machine platform or environment as it can be used to interface with other systems and networks, in accordance with an embodiment.

FIG. 6 shows an illustration of a middleware machine platform or environment as it can be used to interface with other systems and networks, in accordance with an embodiment. As shown in FIG. 6, regardless of whether the middleware machine 230 is provided as a quarter-rack, half-rack, or full-rack configuration, the middleware machine hardware 232 can include a plurality of high-performance servers, such as X4170 M2 server nodes; one or more InfiniBand switch/gateways, such as NM2-GW nodes; one or more storage components, such as Maguro RW-2 nodes; and one or more management switches, such as Cisco 4948 switches, that are coupled together, using InfiniBand, and that can be managed using a management network 234. In accordance with an embodiment, the InfiniBand switch/gateways, such as NM2-GW nodes, can be used to provide 10 Gb Ethernet connectivity to one or more data center service networks 236. The one or more management switches, such as Cisco 4948 switches, can be used to provide 1 Gb Ethernet connectivity to one or more data center management networks 238. The InfiniBand network can also be used to connect the middleware machines to other middleware machines, or to other machine environments, such as an Exadata machine 240.

In accordance with an embodiment, regardless of whether the middleware machine 230 is provided as a quarter-rack, half-rack, or full-rack configuration, the middleware machine hardware and/or software environment can include additional features, e.g. Zero Buffer Copies, Scatter/Gather I/O, T3 Connections, and Lazy Deserialization, that improve the performance of the middleware machine.

Zero Buffer Copying

In accordance with an embodiment, the system can use zero buffer copying, which avoids buffer copies in components such as WebLogic Server (WLS), JRockit or Hotspot JVM, Oracle Linux or Solaris, and the operating system (OS). Traditionally, each layer (e.g., the server layer, the JVM layer, the OS layer, etc) of a system keeps a private memory space that other layers, applications and processes cannot access. This is to protect the overall stability of the system by preventing foreign systems from corrupting key memory spaces and data and contributing to a system crash. As such, during request and response processing, data related to the request and response are copied between layers, from private memory space to private memory space. That is, after a given layer has processed the data, it pushes it to the next layer which then copies the data in to its private memory space, operates on it and pushes it to the next layer, etc. However, embodiments of the present invention provide tight integration between the various layers, enabling them to share memory spaces safely, without increasing risk to system stability. As such this reduces CPU utilization in the User & Kernel space, and as such reduces latency.

Figure 7:
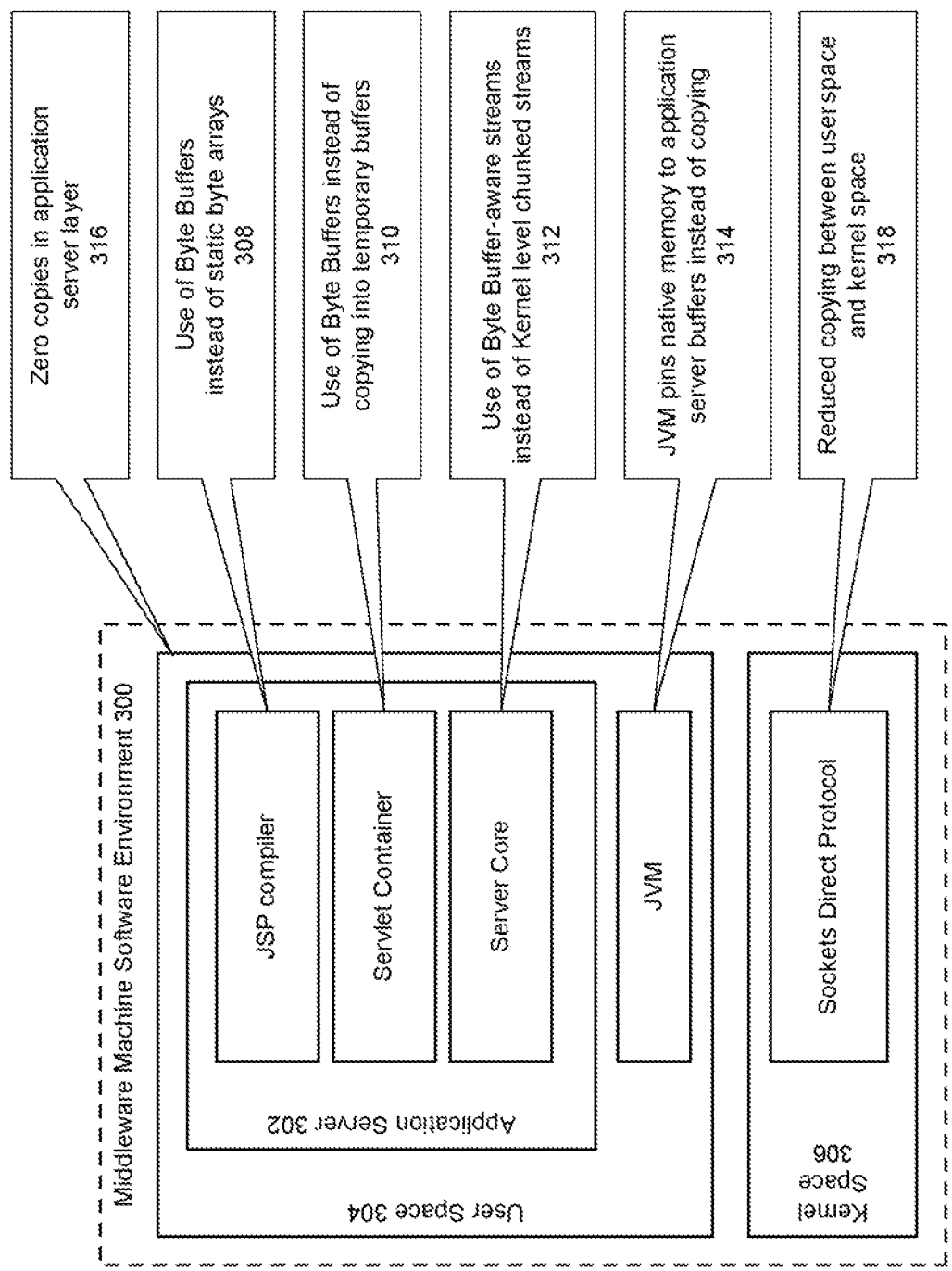
FIG. 7 shows a system for providing zero buffer copying, in accordance with an embodiment.

FIG. 7 shows a system 300 for providing zero buffer copying, in accordance with an embodiment. As shown in FIG. 7, a number of different features can be provided in each of the Application Server 302, User Space 304, and Kernel Space 306. At the server level, byte buffers can be used instead of static byte arrays and temporary buffers. For example, the JSP compiler can use byte buffers 308 instead of static byte arrays. A byte buffer can be created by wrapping a backing byte array. Changes made to either the byte buffer or the backing byte array are reflected in the other. Thus, rather than creating a new byte array for each layer to operate on and then copying that byte array into a new byte array for the next layer, one byte array can be stored and a byte buffer wrapped around that byte array. As each layer operates on the byte array, the changes are applied to the byte array. This limits the amount of copying required, and improves performance. Similarly, the servlet container can use 310 the byte buffers instead of copying into temporary buffers, and the server core can use 312 byte buffer-aware streams instead of Kernel level chunked streams, and enabling the JVM to pin native memory to WLS buffers instead of copying 314. By pinning the memory, the JVM ensures that that memory is not garbage collected or used by any other process. Thus, at each step in the processing of the data, a pointer or reference to the data in memory can be used, instead of copying the data at each step. These improvements allow for zero copying at the server layer 316, saving CPU cycles and improving performance.

In accordance with an embodiment, the platform also supports use 318 of Socket Direct Protocol (SDP) that avoids copying of the byte buffer data from the JVM running in user space to the network stack in the kernel space. This further reduces the number of buffer copies while serving HTTP requests. Avoiding copying saves CPU cycles both in the user and the kernel space which reduces latencies for HTTP traffic.

In an exemplary embodiment, the application server (e.g. WebLogic Server) can be modified to achieve zero buffer copies while serving HTTP requests. A WebLogic Server JSP Compiler can write static JSP content directly into a Java New I/O (NIO) byte buffers. At runtime, a web container can pass these byte buffers directly to byte buffer-aware WebLogic Server IO Streams without any copying. These byte buffers can be then directly written out by the NIO Muxer using gathered writes. A JVM (e.g. JRockit or HotSpot JVM) running on Exalogic can pin these byte buffers in memory and avoid making a copy of the data to the native memory.

Figure 8:
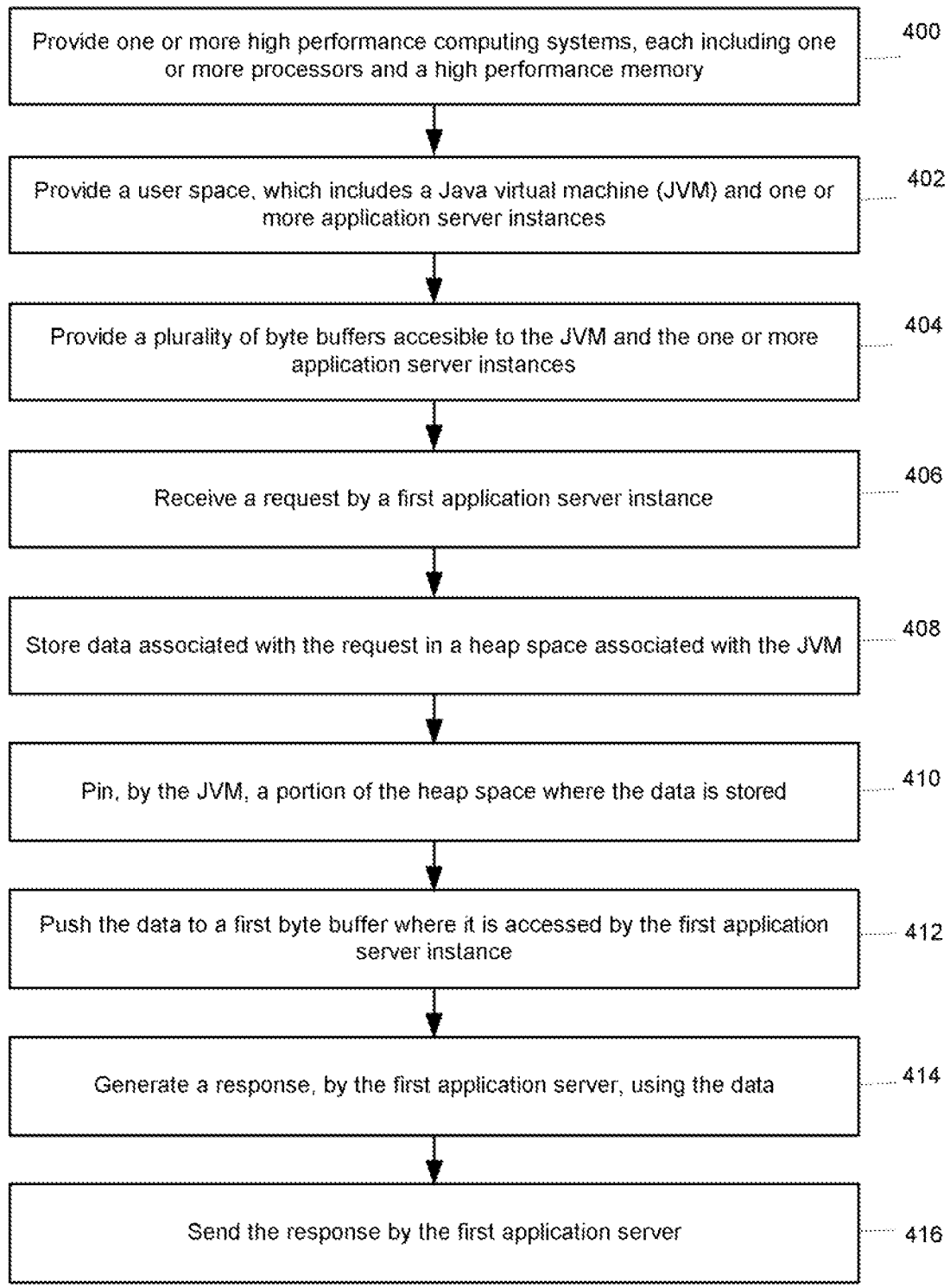
FIG. 8 shows a flowchart of a method for zero buffer copying, in accordance with an embodiment.

FIG. 8 shows a flowchart of a method for zero buffer copying, in accordance with an embodiment. At step 400, one or more high performance computing systems, each including one or more processors and a high performance memory, is provided. At step 402, a user space, which includes a Java virtual machine (JVM) and one or more application server instances, is provided. At step 404, a plurality of byte buffers accesible to the JVM and the one or more application server instances, are provided. At step 406 a request is received by a first application server instance. At step 408, data associated with the request is stored in a heap space associated with the JVM. At step 410, the JVM pins a portion of the heap space where the data is stored. At step 412, the data is pushed to a first byte buffer where it is accessed by the first application server instance. At step 414, a response is generated by the first application server, using the data. At step 416, the response is sent by the first application server.

In accordance with an embodiment, the method shown in FIG. 8 can further include the steps of providing a kernel space which includes support for sockets direct protocol (SDP); and providing one or more byte buffer-aware streams accessible to the kernel space and the user space. Additionally, in the method shown in FIG. 8, each byte buffer can be a Java New I/O (NIO) byte buffer. Furthermore, the request can be an HTTP request. Also, in the method shown in FIG. 8, the first byte buffer can include a reference pointing to where the data is stored in the heap space.

Scatter/Gather I/O

In accordance with an embodiment, the system can use Scatter/Gather I/O, which minimizes fragmentation of network packets, allowing the OS to perform fragmentation based on the use of Java New I/O (NIO). Additionally, in accordance with an embodiment, the system uses Internet Protocol over InfiniBand (IPoIB) protocol, which has a maximum transfer unit (MTU) of 64 KB. By comparison, Ethernet has an MTU of 1.5 KB. Using IPoIB allows the application server, e.g. WebLogic Server, to write more data at a time. Additionally, typical Ethernet connections provide speeds on the order of 1 Gb/s, however, by using an InfiniBand network, speeds of upwards of 40 Gb/s are available. This provides greater flexibility and allows much more data to be passed through the connection. Ideally, the system that utilizes such a connection can adapt to push more data through the network to saturate, and efficiently use, the available bandwidth.

FIG. 9 shows a system that utilizes Ethernet protocol, in accordance with an embodiment. In a system that utilizes an Ethernet network 500, data can only be written in relatively small portions. As shown in FIG. 9, server 502 is connected to server 504 via an Ethernet network 500. The two servers communicate across a single channel using single muxers 506 and 508. Data transmissions are limited by the Ethernet connection which, as shown in FIG. 9, force the servers to communicate in 4 KB chunks. Attempts to transmit more data than this at a time, and the capacity of the network will be exceeded. This forces more work to be performed at the kernel level, specifically the kernel level divides the data into smaller units and imposes flow control on the fly. This can be costly in time and resources.

FIG. 10 shows a system that utilizes IPoIB and parallel muxing, in accordance with an embodiment. As described above, the InfiniBand network provides greater bandwidth compared to typical Ethernet connections. This greater bandwidth allows for a larger MTU to be used. As shown in FIG. 10, server 506 is connected to server 508 over an InfiniBand network 510. By utilizing the greater bandwidth available through InfiniBand, the system can push data through in much larger, as compared to Ethernet, 64 KB chunks. In such a system, the kernel level recognizes the increased bandwidth and pushes the larger data units without performing the additional work of further dividing the data into smaller units and imposing flow control.

In accordance with an embodiment, within a cluster, multiple parallel logical connections, i.e., channels, can be used between servers. This allows for more data to be passed between servers concurrently, enabling multiple threads to execute in parallel. As shown in FIG. 10, each server utilizes a parallel muxer, 512 and 514, which can manage the various connections to ensure that the multiple threads do not interfere with, or block, one another. This further improves the use of the available bandwidth improving the efficiency of data transfers between servers.

Figure 11:
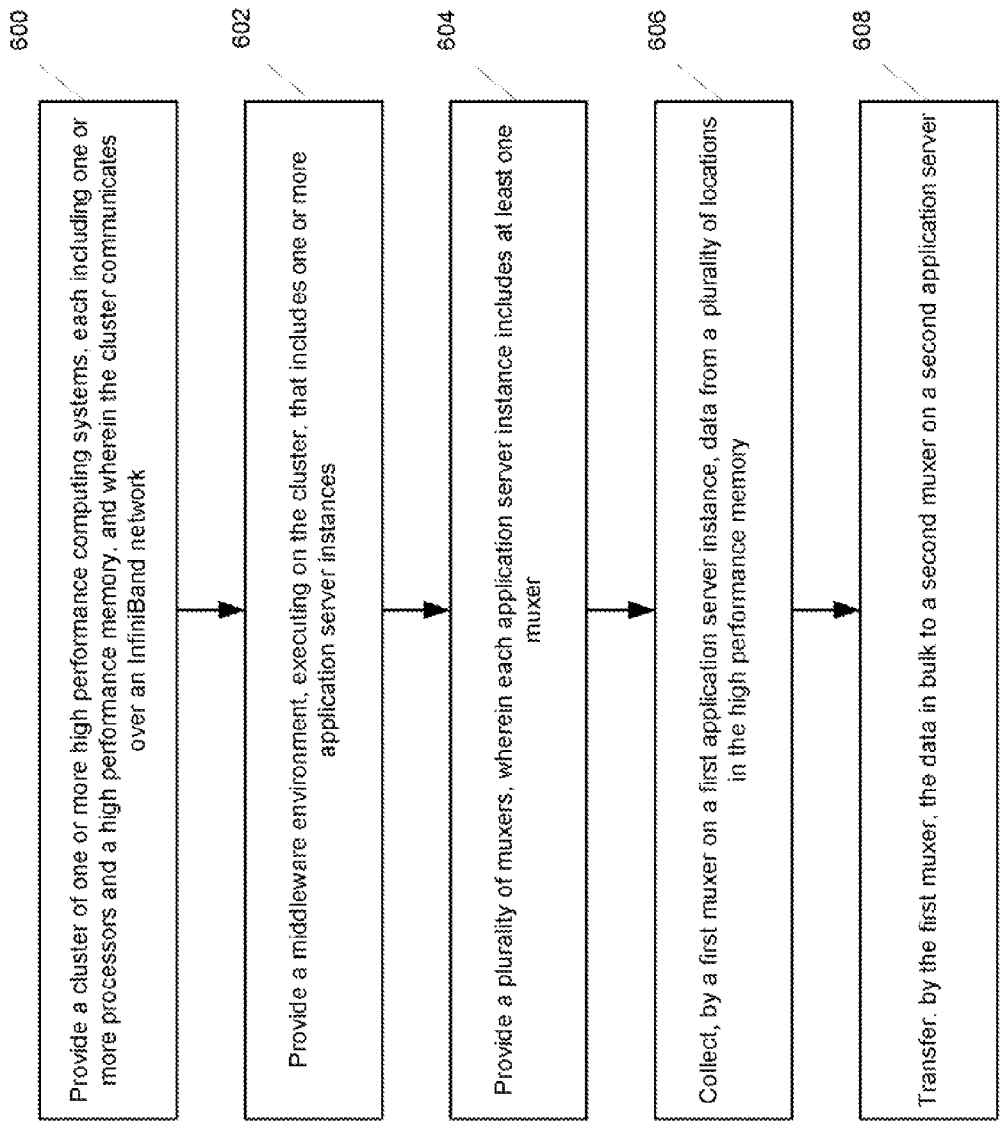
FIG. 11 shows a flowchart of a method for providing scatter/gather I/O in accordance with an embodiment.

FIG. 11 shows a flowchart of a method for providing scatter/gather I/O in accordance with an embodiment. At step 600, a cluster of one or more high performance computing systems is provided. Each high performance computing system can include one or more processors and a high performance memory. The cluster can communicate over an InfiniBand network. At step 602, a middleware environment, executing on the cluster, that includes one or more application server instances is provided. At step 604, a plurality of muxers are provided. Each application server instance includes at least one muxer. At step 606, a first muxer, on a first application server instance, collects data from a plurality of locations in the high performance memory. At step 608, the first muxer transfers the data in bulk to a second muxer on a second application server.

In accordance with an embodiment, the method shown in FIG. 11 can further include comprising managing, by each muxer, a plurality of threads transmitting data across a plurality of parallel channels. A user can configure how many parallel channels are included in the plurality of parallel channels. Additionally, as described above, each muxer can be a New I/O (NIO) muxer. Further, each data transfer can use scatter/gather data processing.

T3 Connections (Parallel Muxing)

In particular, as described herein, systems and methods are provided for providing parallel muxing between servers in a cluster. One such system can include a cluster of one or more high performance computing systems, each including one or more processors and a high performance memory. The cluster communicates over an InfiniBand network. The system can also include a middleware environment, executing on the cluster, that includes one or more application server instances. The system can further include a plurality of muxers, wherein each application server instance includes at least one muxer. Each muxer can receive information from a plurality of threads to transmit to a different muxer on a different application server instance over the Infiniband network using a plurality of parallel channels.

Figure 12:
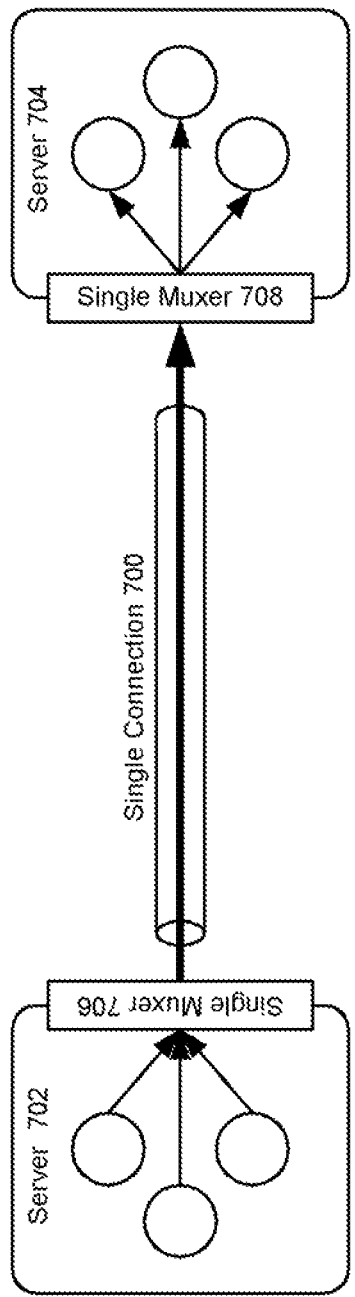
FIG. 12 shows a system that utilizes a single connection between servers, in accordance with an embodiment.

FIG. 12 shows a system that utilizes a single connection between servers, in accordance with an embodiment. As illustrated in FIG. 12, in a typical clustered scenario, a single connection 700 is effected between servers 702 and 704. For example, communications from server 702 are sent to a single muxer 706, where they are transmitted to server 704 over the single connection 700. A corresponding single muxer 708 at server 704 then forwards the communications to their appropriate destinations. However, this single connection is unable to fully utilize bandwidth available in an InfiniBand (IB) network.

Figure 13:
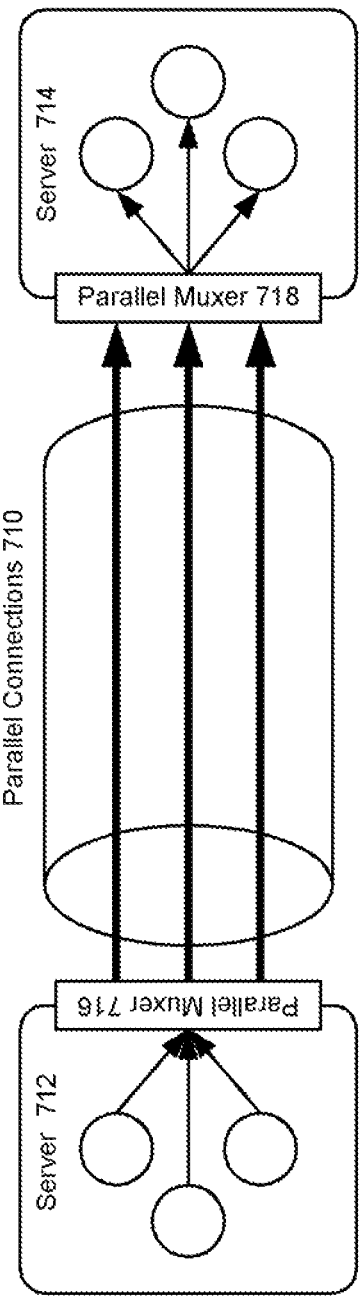
FIG. 13 shows a system that utilizes parallel connections between servers, in accordance with an embodiment.

FIG. 13 shows a system that utilizes parallel connections between servers, in accordance with an embodiment. As shown in FIG. 13, a plurality of parallel connections 710 can be maintained between servers 712 and 714. Each server includes a parallel muxer, 716 and 718, to send communications in parallel over the plurality of connections between the servers. In accordance with an embodiment, the T3, or similar, protocol can be modified to allow multiple connections, which avoids per-connection bottlenecks, and allows better utilization of network bandwidth for features such as in-memory session replication. This enables the available IB bandwidth to be better utilized and provides more efficient communications, with fewer slowdowns, between peers.

As described above, in accordance with an embodiment the platform supports the Internet Protocol over InfiniBand (IPoIB) network in its backplane, wherein the network bandwidth of IB is 25 Gbps. Since a single connection, such as the T3 in Weblogic Server, is unable to fully utilize IB bandwidth for cluster communication, multiple connections have been created in parallel to better utilize network bandwidth. Multiple connections help in spreading out the session replication network traffic.

In accordance with an embodiment, a server, for example a WebLogic server using the T3 protocol, can aggregate messages from all threads into a single sender queue which is flushed over the network by a single thread. Lock contention can occur when multiple processes require the same lock to proceed, for example lock contention can occur between threads attempting to add messages into the sender queue. By creating multiple connections in parallel, lock contention is distributed over multiple connections, thus reducing the per connection lock contention. Also, there are multiple sender threads sending messages over to a remote server instance causing parallelization of work flow.

In accordance with an embodiment, implicit replication channels can be created by using the replication channel configured on a ClusterMBean as a template. The number of implicit channels created is based on the ServerMBean.getReplicationPorts ( ) attribute. The implicit channels copy over all the attributed from the ClusterMBean.ReplicationChannels while overriding the port information to keep it unique. The overriding port information is obtained from ServerMBean.getReplicationPorts ( ). Additionally, the system can include a utility function which can be used to determine if multiple channels are configured. The utility can make the determination once, automatically at regular intervals, in response to changes to the configuration, and/or at the direction of a user and cache the result for subsequent calls. The system can further create an exclusive RMI stub for each replication channel configured (stub assigned for each connection). The system can hash the sessionID to balance the replication request amongst all the stubs, for example by using round-robin or other similar balancing algorithm. The system can also ensure that replication calls are received on one of the replication channels configured for the server.

In accordance with an embodiment, using InfiniBand provides more bandwidth than prior systems which, effectively, provides a larger pipe through which data can be transmitted. To better utilize the larger pipe, multiple parallel logical connections, i.e., channels, can be used instead of a single logical connection. Multiple connections means more concurrent activity can execute without the various executing threads blocking each other. This can be useful, for example for clustering; that is, where multiple servers are communicating with each other in a cluster. In a cluster, session data replication between servers is an important feature. Session data can include, for example, shopping cart or other user data that is specific to a particular visit, or session, to a website. By using multiple connections between servers in the cluster, in-memory session replication to each server can be effected more reliably and more efficiently. This preserves session data in case of server failure and improves the experience of the end user and the service provider.

Figure 14:
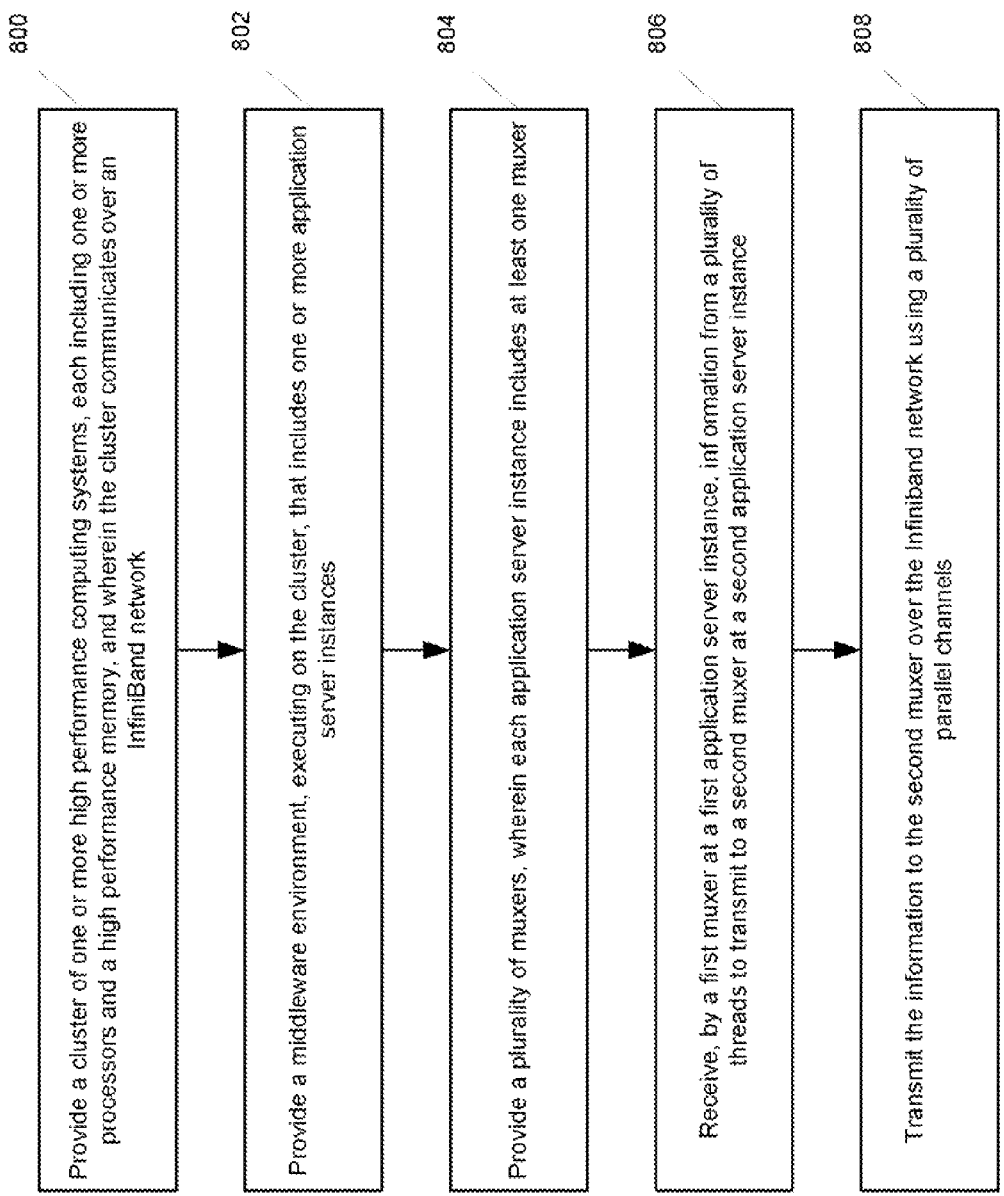
FIG. 14 shows a flowchart of a method for providing parallel muxing between servers in a cluster, in accordance with an embodiment.

FIG. 14 shows a flowchart of a method for providing parallel muxing between servers in a cluster, in accordance with an embodiment. At step 800, a cluster of one or more high performance computing systems is provided. Each of the high performance computing systems can include one or more processors and a high performance memory. Additionally, the cluster can communicate over an InfiniBand network. At step 802, a middleware environment, which executes on the cluster, is provided. The middleware environment can include one or more application server instances. At step 804, a plurality of muxers are provided. Each application server instance can include at least one muxer. At step 806, a first muxer, at a first application server instance, receives information from a plurality of threads to transmit to a second muxer at a second application server instance. At step 808, the information is transmitted to the second muxer over the Infiniband network using a plurality of parallel channels.

In accordance with an embodiment, the method shown in FIG. 14 can also include configuring how many parallel channels are included in the plurality of parallel channels, based on input from a user. Additionally, the information transmitted can include session data. Furthermore, each muxer can be a New I/O (NIO) muxer. The method shown in FIG. 14 can further include creating an RMI stub for each of the plurality of parallel channels.

In-Memory Session Replication in a Server Cluster

In accordance with one embodiment, the system can support in-memory session replication in a server cluster using a lazy deserialization approach. A middleware machine platform or environment can include one or more clusters of application servers. The system is able to recover from service failures, so that the middleware machine platform can provide high availability. In accordance with an embodiment, session state is used in the middleware machine platform for storing important user session information. The system can use different methods for replicating session state associated with user service request across clusters, such as in-memory replication and JDBC-based persistence. Using in-memory replication, the system copies a session state from one server instance to another. The primary application server creates a primary session state on the server to which the client first connects, and a secondary replica on another server instance in the cluster. The replica is kept up-to-date so that it can be used if the primary application server, for example the server that hosts the servlet, fails. In JDBC-based persistence, the system maintains a session state, for example the session state of a servlet or JSP, using file-based or JDBC-based persistence. JDBC-based persistence is also used for session state replication within a Wide Area Network (WAN).

In accordance with an embodiment, the system can perform a serialization step to convert the primary session data for data transmission. The serialization step is a process of converting a complex data structure, such as a parallel arrangement of data, into a serial form. The parallel arrangement of data transmits a number of bits at a time along parallel channels, while the serial form transmits one bit at a time. Serializing session data introduces some overhead for replicating the session state. The overhead increases as the size of serialized objects grows. For example, if a user plans to create very large objects in a HTTP session, the performance of a servlets may need to be tested to ensure that performance is acceptable.

In accordance with an embodiment, to support in-memory replication for session, session states need to be serializable. Every field in an object needs to be serializable or transient in order for the object to be considered serializable. For example, all servlet and JSP session data in HTTP session states need to be serializable. If the servlet or JSP uses a combination of serializable and non-serializable objects, the system may not replicate the session state of the non-serializable objects.

In accordance with an embodiment, session state can be altered using functions provided by the system. For example, a special function HttpSession.setAttribute ( ) can be used to change attributes in a session object in an HTTP servlet that implements javax.servlet.http.HttpSession. If a user set attributes in a session object with setAttribute, the object and its attributes are replicated in a cluster using in-memory replication. If the user uses other set methods to change objects within a session, the system may not replicate those changes. Every time a change is made to an object that is in a session, setAttribute( ) can be called to update that object across the cluster. Likewise, removeAttribute( ) can be used to remove an attribute from a session object.

Figure 15:
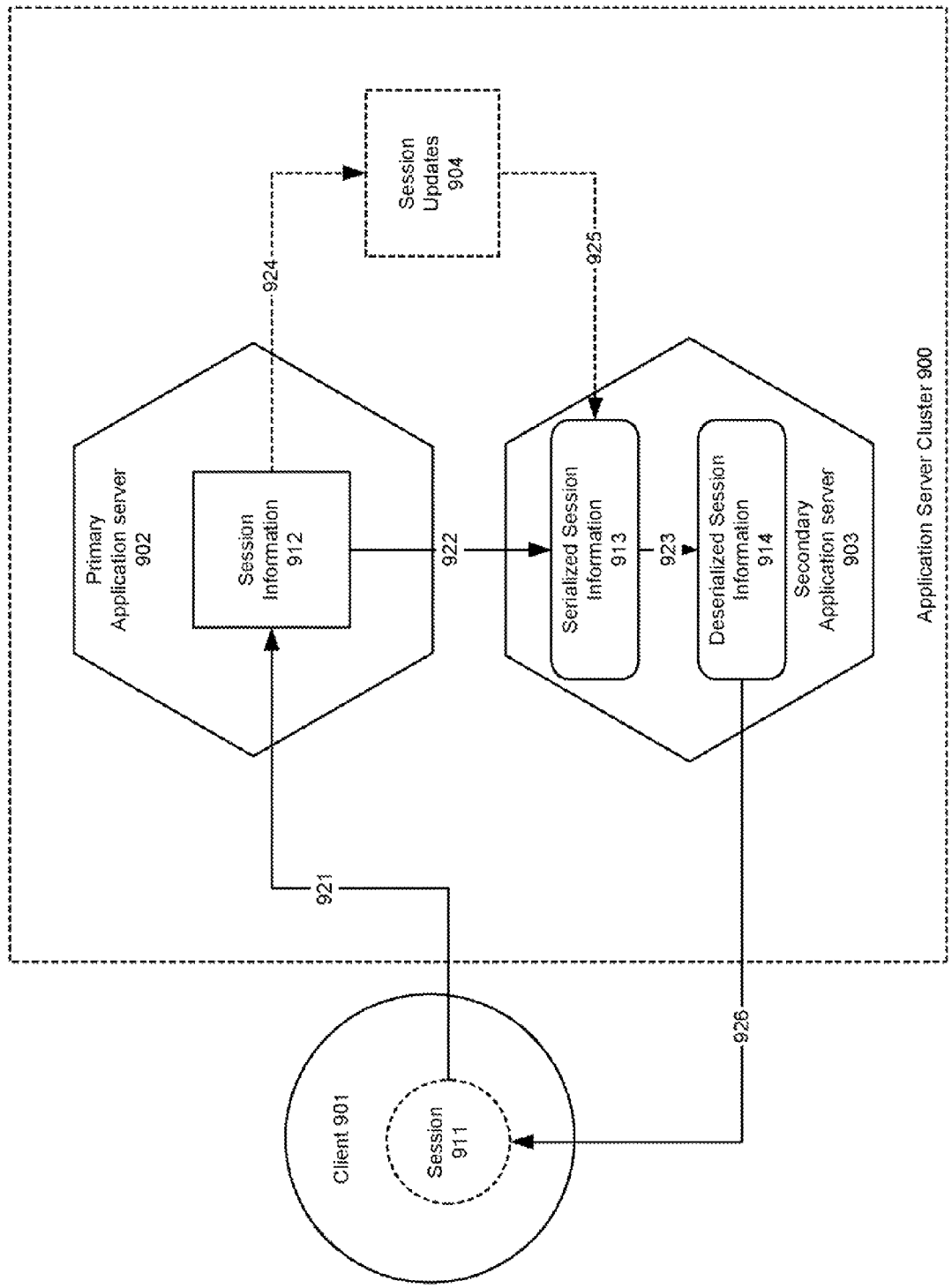
FIG. 15 shows an illustration of a system to support in-memory session replication in a server cluster in accordance with an embodiment.

FIG. 15 shows an illustration of a system to support in-memory session replication in a server cluster in accordance with an embodiment. As shown in FIG. 15, a client 901 can interact with a server cluster 900 that includes a primary application server 902 and a secondary application server 903. The primary application server operates to receive a request associated with a session 911 from the client at step 921, and maintains session information 912 associated with the session. The primary application server can also respond to the client based on the session information. Furthermore, the secondary application server operates to receive and maintain serialized session information 913 from the primary application server at step 922.

In accordance with an embodiment, during the interaction between the client and the primary application server, the session information maintained on the primary application server can be changed at step 924. At runtime, the primary application server can send these session updates 904 to the secondary application server at step 925. And, the secondary application server operates to update the stored serialized session information based on the session updates received from the primary application server.

In accordance with one embodiment, the serialized session data can be stored in a binary format, for example as byte arrays, in the secondary application server. The system can apply different logics for updating the binary serialized session data efficiently. In one embodiment, the system detects the entries in the byte arrays in the secondary application server that are affected by a particular session update. The system can then update the affected entries in the byte arrays directly without the need to replace the whole serialized session data in the byte arrays. This is particularly useful when the stored serialized session data are large in size.

In accordance with an embodiment, when the primary application server fails, the secondary application server operates to generate deserialized session information 914 based on the updated serialized session information at step 923. The secondary application server, or another application server in the middleware environment, can use the deserialized session information and responds to the client at step 926.

In accordance with one embodiment, the system can optimize the in-memory session replication process by performing the deserialization step only when the primary application server fails. The optimization prevents the deserialization operation when primary application server is alive. With such optimization, the system can avoid taking a serialization step in the primary application server and a deserialization step in the secondary application server for every session update, which is expensive in terms of CPU utilization cost and latency overhead, especially when there are frequently session updates.

In accordance with an embodiment, a user can further control where secondary states are placed using replication groups. A replication group is a preferred list of clustered servers to be used for storing session state replicas. A user can assign the server to a replication group, and a preferred secondary replication group for hosting the serialized replica of the primary HTTP session states created on the server. When a client attaches to a server in the cluster and creates a primary session state, the server hosting the primary state ranks other servers in the cluster to determine which server should host the secondary. Server ranks are assigned using a combination of the server's location (whether or not it resides on the same machine as the primary application server) and its participation in the primary application server's preferred replication group.

Figure 16:
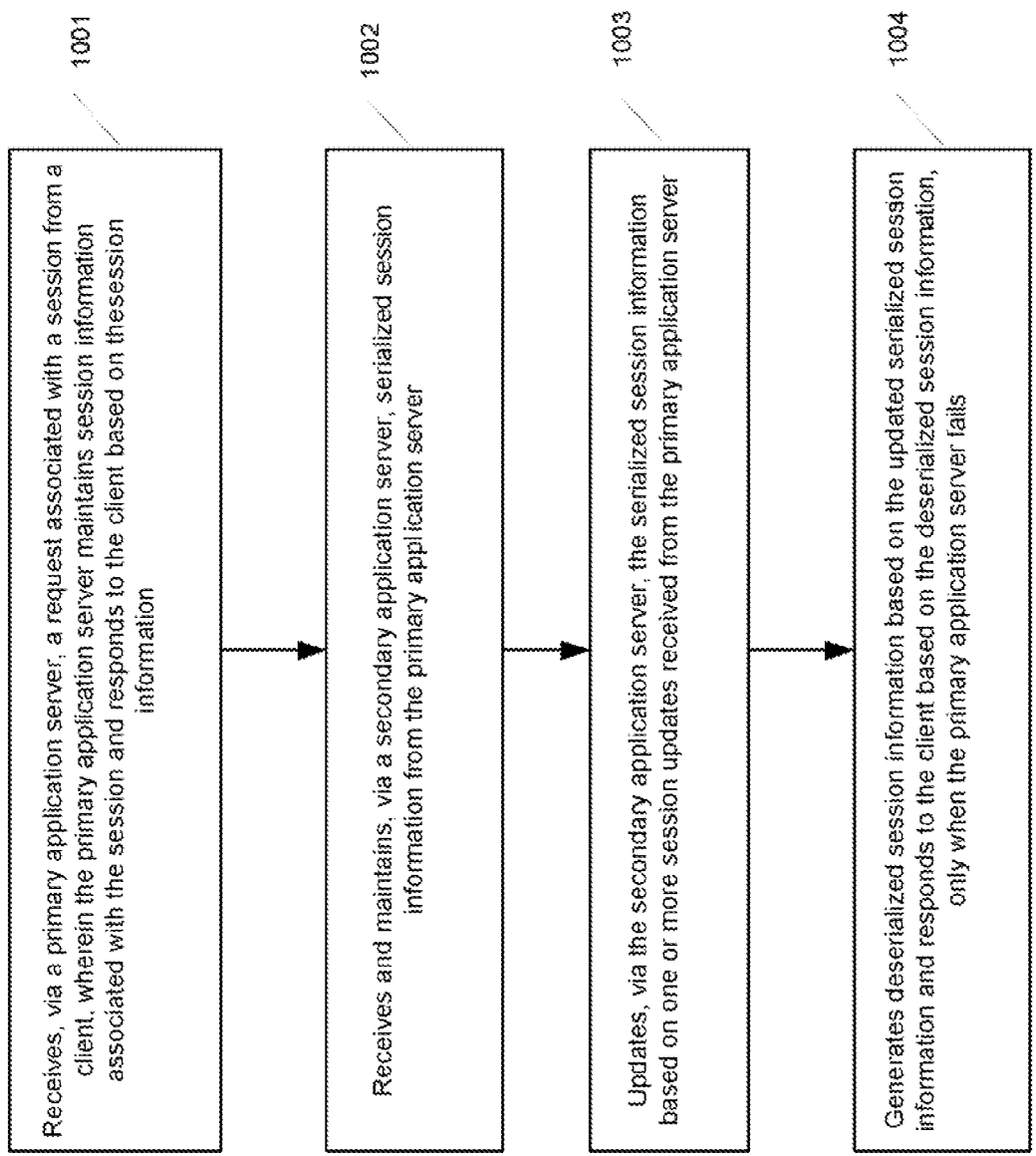
FIG. 16 illustrates an exemplary flow chart for supporting in-memory session replication in a server cluster in accordance with an embodiment.

FIG. 16 illustrates an exemplary flow chart for supporting in-memory session replication in a server cluster in accordance with an embodiment. As shown in FIG. 16, a primary application server receives a request associated with a session from a client at step 1001. The primary application server also maintains session information associated with the session and responds to the client based on the session information. Then, a secondary application server can receive and maintain serialized session information from the primary application server at step 1002. The secondary application server can further update the serialized session information based on one or more session updates received from the primary application server at step 1003. Finally, in step 1004, only when the primary application server fails, the updated serialized session information can be deserialized and an application server can respond to the client based on the deserialized session information.

HTTP Session Replication

In order to support automatic replication and failover for servlets and JSPs within a cluster, the system can support two mechanisms for preserving HTTP session state: hardware load balancers and proxy plug-ins.

In accordance with one embodiment, a load balancing hardware can simply redirect client requests to any available server in the application server cluster, when a primary application server fails. The cluster can obtain the replica of the client's HTTP session state from a secondary application server in the cluster.

Figure 17:
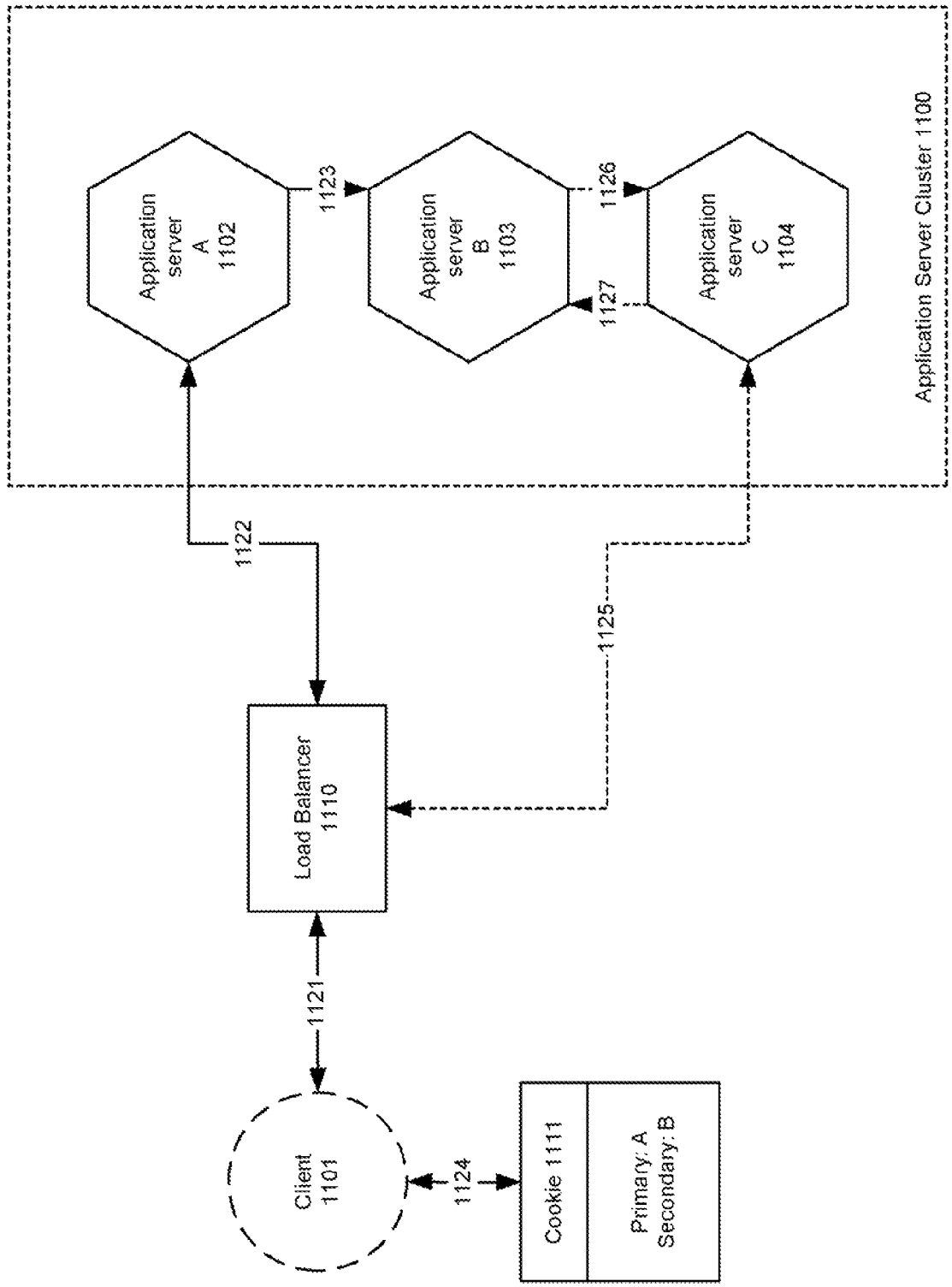
FIG. 17 shows an illustration of a system to support in-memory session replication in a server cluster using a load balancer in accordance with an embodiment.

FIG. 17 shows an illustration of a system to support in-memory session replication in a server cluster using a load balancer in accordance with an embodiment. As shown in FIG. 17, when a client 1101 of a web application requests a servlet using a public IP address at step 1121, a load balancer 1110 routes the client's connection request to an application server cluster 1100 in accordance with its configured policies. The system directs the request to an application server A 1102, which acts as the primary host of the client's servlet session state at step 1122. The system can use a ranking system to select a secondary application server B 1103 to host the serialized session state associates with the session at step 1123.

The client can record the location of both application server instances A and B in a local cookie 1111 at step 1124. If the client does not allow cookies, the record of the primary and secondary application servers can be recorded in the URL returned to the client via URL rewriting.

As the client makes additional requests to the cluster, the load balancer uses an identifier in the client-side cookie to ensure that those requests continue to go to the application server A, rather than being load-balanced to another server in the cluster. This ensures that the client remains associated with the server hosting the primary session object for the life of the session.

In response to a connection failure, the load balancing hardware uses its configured policies to direct the request to an available server in the cluster at step 1125. In the above example, assuming that the load balancer routes the client's request to an application server C 1104 after server A fails. When the client connects to server C, the server uses the information in the client's cookie, or the information in the HTTP request if URL rewriting is used, to connect to server B. The application server C can further acquire the session state through deserializing the serialized session state on server B at step 1126. The failover process remains completely transparent to the client. The deserialization step only needs to be performed once after a connection failure. Server C becomes the new host for the client's primary session state, and server B continues to host the serialized session state and receive session updates from server C at step 1127. This new information about the primary and secondary host is again updated in the client's cookie, or via URL rewriting.

In accordance with one embodiment, an application server proxy plug-in maintains a list of application server instances that host a clustered servlet or JSP, and forwards HTTP requests to those instances using a round-robin strategy. The plug-in also provides the logic necessary to locate the serialized replica of a client's HTTP session state if an application server instance fails.

Figure 18:
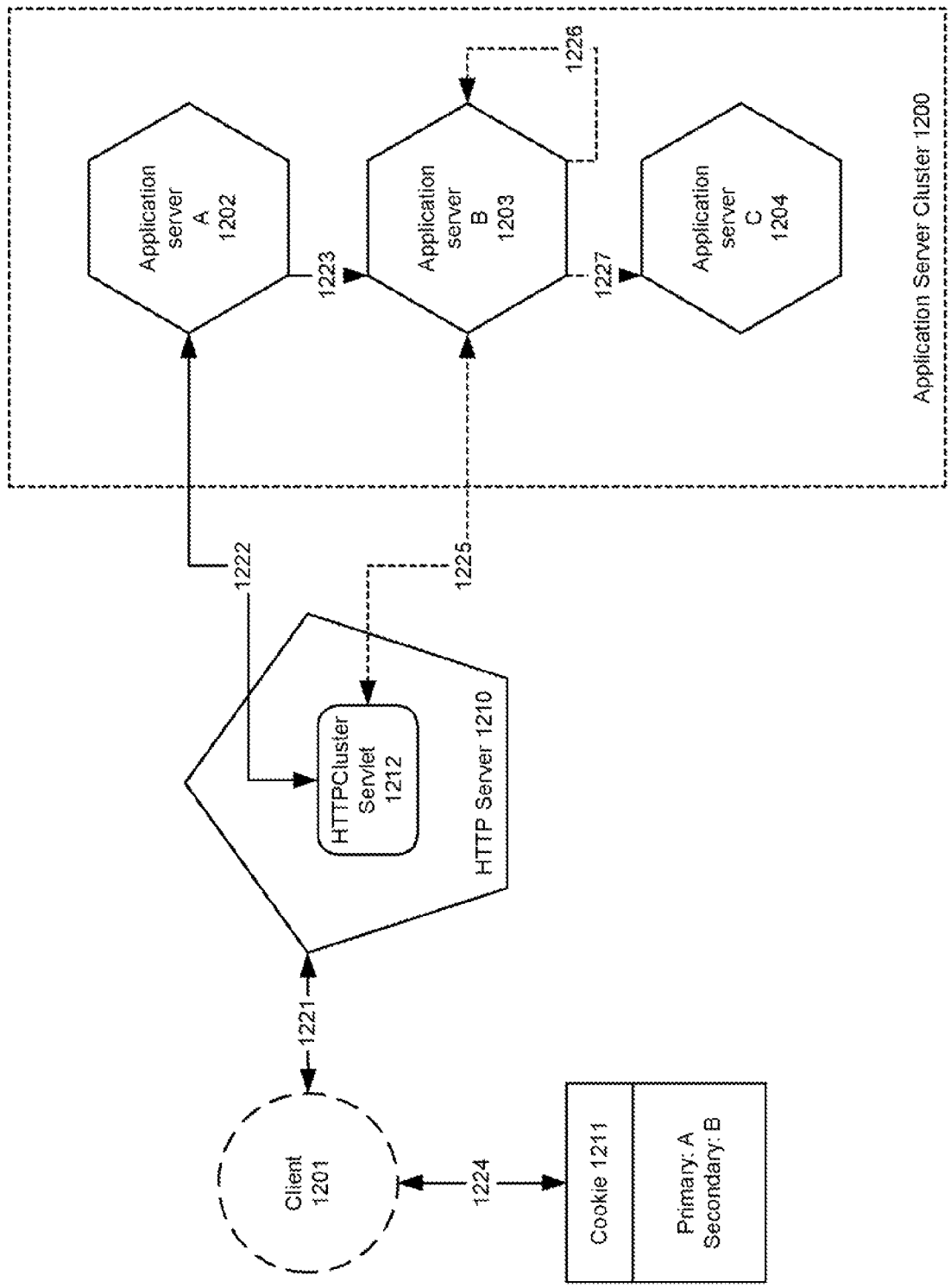
FIG. 18 shows an illustration of a system to support in-memory session replication in a server cluster using a proxy plug-in in accordance with an embodiment.

FIG. 18 shows an illustration of a system to support in-memory session replication in a server cluster using a proxy plug-in in accordance with an embodiment. As shown in FIG. 18, when a HTTP client 1201 requests a servlet at step 1221, a HttpClusterServlet 1212 on a HTTP server 1210 proxies the request to the application server cluster 1200. The HttpClusterServlet maintains the list of all servers in the cluster, and the load balancing logic to use when accessing the cluster. In the above example, the HttpClusterServlet can route the client request to the servlet hosted on an application server A 1202, which becomes the primary application server hosting the client's servlet session at step 1222.

To provide failover services for the servlet, the primary application server transmits the serialized client's servlet session state to a secondary application server in the cluster at step 1223. In the example above, application server B 1203 is selected as the secondary application server.

The servlet page can be returned to the client through the HttpClusterServlet, and the client browser is instructed to write a cookie 1211 that lists the primary and secondary locations of the servlet session state at step 1224. If the client browser does not support cookies, the application server can use URL rewriting instead.

When the primary application server A fails, HttpClusterServlet can use the client's cookie information to determine the location of the secondary application server that hosts the replica of the session state. HttpClusterServlet can automatically redirect the client's next HTTP request to the secondary application server at step 1225. The failover is transparent to the client, and server B can deserialize the serialized session state and acquires acquire the session state at step 1226.

After the failure, server B becomes the primary application server hosting the servlet session state, and a new secondary can be created on, for example, an application server C 1204. Server C can then host the serialized session state and receive session updates from server B at step 1227. In the HTTP response, the proxy updates the client's cookie to reflect the new primary and secondary application servers, to account for the possibility of subsequent failovers.

Cross-Cluster Session Replication

In accordance with one embodiment, in addition to providing HTTP session state replication across servers within a cluster, an application server provides the ability to replicate HTTP session state across multiple clusters. This improves high-availability and fault tolerance by allowing clusters to be spread across multiple geographic regions, power grids, and internet service providers.

Figure 19:
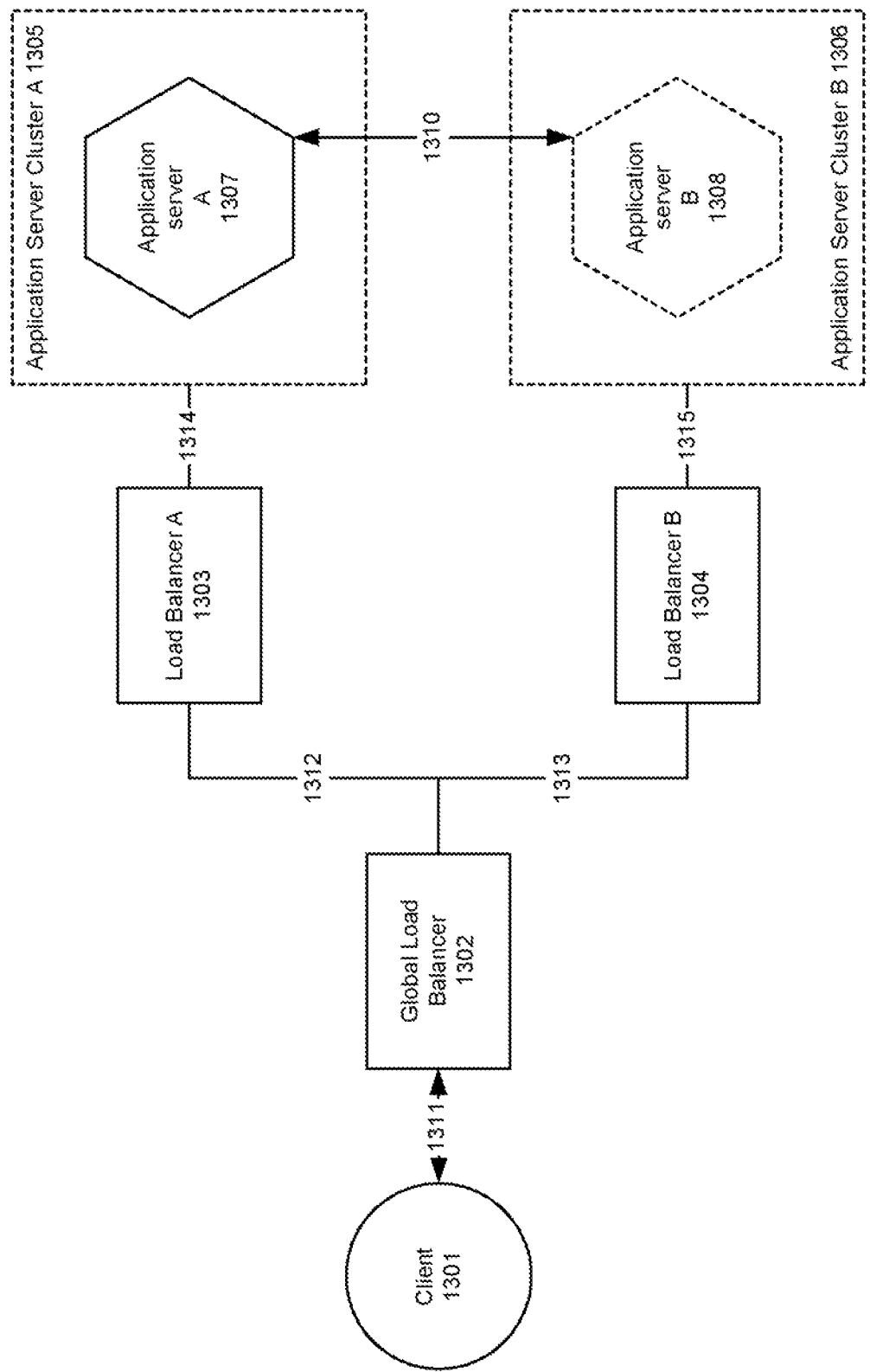
FIG. 19 shows an illustration of a system to support in-memory session replication cross server clusters in accordance with an embodiment.

FIG. 19 shows an illustration of a system to support in-memory session replication cross server clusters in accordance with an embodiment. As shown in FIG. 19, in a network configuration that supports cross-cluster replication, a global load balancer 1302 is responsible for balancing HTTP requests across clusters 1305 and 1306. When a request comes in from a client 1301 at step 1311, the global load balancer determines which cluster to send it to based on the current number of requests being handled by each cluster. Then the request is passed to a local load balancer 1303 or 1304 for the chosen cluster at step 1312 or 1313. When the local load balancer receives HTTP requests from the global load balancer, the local load balancer is responsible for balancing HTTP requests across servers within the cluster at step 1314 or 1315.

In order to replicate session data from one cluster to another, a replication channel 1310 can be configured to communicate session state information from the primary to the secondary cluster. A replication channel can be a network channel that is dedicated specifically to replication traffic between clusters. When a server within a cluster fails, the local load balancer is responsible for transferring the request to other servers within a cluster. When the entire cluster fails, the local load balancer returns HTTP requests back to the global load balancer. The global load balancer then redirects this request to the other local load balancer.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a middleware machine, comprising:
   one or more high performance computing hardware systems, each including one or a plurality of processors, a high performance memory, and a networking component; and
   a middleware environment operating thereon that includes one or a plurality of application server instances, and one or more Java virtual machines (JVMs), wherein each of said application server instances includes at least one muxer;
   wherein when a request is received by a said application server instance that includes a plurality of layers to process the request
      data associated with the request is stored in one or more byte arrays on a heap space of a said JVM, wherein each said layer applies one or more changes to the data via one of a plurality of byte buffers, wherein each said byte buffer is accessible to the JVM and the said application server instance and includes a pointer to the data, a response is generated by the said application server using the data, and gathered from the one or more byte arrays using scatter/gather input/output (I/O), and the response is received from a plurality of threads by a sender queue and transferred therefrom using a said muxer to a different said application server instance over a plurality of parallel channels associated with the said muxer.

2. The system of claim 1, wherein the system further comprises a user space, which includes the one or more JVMs and the one or more application server instances;

wherein the JVM pins the portion of the heap space where the data is stored.

3. The system of claim 1, wherein the one or more high performance computing hardware systems are in a cluster that communicates over an InfiniBand network.

4. The system of claim 1, wherein the one or more high performance computing hardware systems are in a cluster that communicates over an InfiniBand network; and wherein the plurality of parallel channels include one or more replication channels created from a template by copying attributes from the template and overwriting port information in the attributes.

5. The system of claim 1, wherein the one or a plurality of application server instances include a primary application server that operates to receive a request associated with a session from a client, wherein the primary application server maintains session information associated with the session and responds to the client based on the session information; and a secondary application server, selected from the replication group of clustered servers, that operates to receive and maintain serialized session information from the primary application server, wherein the secondary application server operates to update the serialized session information based on one or more session updates received from the primary application server; and wherein the secondary application server operates to generate deserialized session information based on the updated serialized session information and responds to the client based on the deserialized session information, only when the primary application server fails.

6. The system of claim 1, wherein the system is deployed as one of a full, half, and quarter rack configurations, that provides an application server grid, storage area network, and InfiniBand network.

7. The system of claim 6, wherein the application server grid includes WebLogic Server, JRockit or Hotspot JVM, Oracle Linux or Solaris, and Oracle VM.

8. The system of claim 7, wherein each of the full, half, and quarter rack configurations includes one or more compute nodes, InfiniBand switch gateway, and storage nodes or units that communicate with one another via an InfiniBand network.

9. A method of providing a middleware machine, comprising the steps comprising:

providing one or more high performance computing hardware systems, each including one or a plurality of processors, a high performance memory, and a networking component; and providing thereon a middleware environment that includes one or a plurality of application server instances, and one or more Java virtual machines (JVMs), wherein each of said application server instances includes at least one muxer;

wherein when a request is received by a said application server instance that includes a plurality of layers to process the request data associated with the request is stored in one or more byte arrays on a heap space of a said JVM, wherein each said layer applies one or more changes to the data via one of a plurality of byte buffers, wherein each said byte buffer is accessible to the JVM and the said application server instance and includes a pointer to the data, a response is generated by the said application server using the data, and gathered from the one or more byte arrays using scatter/gather input/output (I/O), and the response is received from a plurality of threads by a sender queue and transferred therefrom using a said muxer to a different said application server instance over a plurality of parallel channels associated with the said muxer.

10. The method of claim 9, wherein the method further comprises providing a user space, which includes the one or more JVMs and the one or more application server instances;

wherein the JVM pins the portion of the heap space where the data is stored.

11. The method of claim 9, wherein the one or more high performance computing hardware systems are in a cluster that communicates over an InfiniBand network.

12. The method of claim 9, wherein the one or more high performance computing hardware systems are in a cluster that communicates over an InfiniBand network; and wherein the plurality of parallel channels include one or more replication channels created from a template by copying attributes from the template and overwriting port information in the attributes.

13. The method of claim 9, wherein the one or a plurality of application server instances include a primary application server that operates to receive a request associated with a session from a client, wherein the primary application server maintains session information associated with the session and responds to the client based on the session information; and a secondary application, selected from the replication group of clustered servers, that operates to receive and maintain serialized session information from the primary application server, wherein the secondary application server operates to update the serialized session information based on one or more session updates received from the primary application server; and wherein the secondary application server operates to generate deserialized session information based on the updated serialized session information and responds to the client based on the deserialized session information, only when the primary application server fails.

14. The method of claim 9, wherein the system is deployed as one of a full, half, and quarter rack configurations, that provides an application server grid, storage area network, and InfiniBand network.

15. The method of claim 14, wherein the application server grid includes WebLogic Server, JRockit or Hotspot JVM, Oracle Linux or Solaris, and Oracle VM.

16. The method of claim 15, wherein each of the full, half, and quarter rack configurations includes one or more compute nodes, InfiniBand switch gateway, and storage nodes or units that communicate with one another via an InfiniBand network.

17. A non-transitory computer-readable storage medium including instructions stored thereon which, when executed by a computer, cause the computer to perform the steps comprising:

providing one or more high performance computing hardware systems, each including one or a plurality of processors, a high performance memory, and a networking component; and providing thereon a middleware environment that includes one or a plurality of application server instances, and one or more Java virtual machines (JVMs), wherein each of said application server instances includes at least one muxer;

wherein when a request is received by a said application server instance that includes a plurality of layers to process the request data associated with the request is stored in one or more byte arrays on a heap space of a said JVM, wherein each said layer applies one or more changes to the data via one of a plurality of byte buffers, wherein each said byte buffer is accessible to the JVM and the said application server instance and includes a pointer to the data, a response is generated by the said application server using the data, and gathered from the one or more byte arrays using scatter/gather input/output (I/O), and the response is received from a plurality of threads by a sender queue and transferred therefrom using a said muxer to a different said application server instance over a plurality of parallel channels associated with the said muxer.

* * * * *